US012370504B2

(12) United States Patent
Wang et al.

(10) Patent No.: US 12,370,504 B2
(45) Date of Patent: Jul. 29, 2025

(54) HYDROPHOBIC ORGANIC-INORGANIC COMPOSITE HOLLOW FIBER MEMBRANE AND METHOD OF FORMING THE SAME

(71) Applicant: Nanyang Technological University, Singapore (SG)

(72) Inventors: Rong Wang, Singapore (SG); Yuan Zhang, Singapore (SG)

(73) Assignee: Nanyang Technological University, Singapore (SG)

( * ) Notice: Subject to any disclaimer, the term of this patent is extended or adjusted under 35 U.S.C. 154(b) by 29 days.

(21) Appl. No.: 14/467,910

(22) Filed: Aug. 25, 2014

(65) Prior Publication Data

US 2015/0053611 A1     Feb. 26, 2015

Related U.S. Application Data

(60) Provisional application No. 61/869,222, filed on Aug. 23, 2013.

(51) Int. Cl.
*B01D 71/64* (2006.01)
*B01D 67/00* (2006.01)
(Continued)

(52) U.S. Cl.
CPC ..... *B01D 71/641* (2022.08); *B01D 67/00793* (2022.08); *B01D 67/00931* (2022.08);
(Continued)

(58) Field of Classification Search
CPC .... B01D 71/64; B01D 2325/36; B01D 71/68; B01D 2313/025; B01D 2313/04;
(Continued)

(56) References Cited

U.S. PATENT DOCUMENTS

| 2008/0039554 A1* | 2/2008 | Liu | B01D 67/0079 |
| | | | 523/310 |
| 2010/0233812 A1* | 9/2010 | Sun | C01G 23/047 |
| | | | 95/45 |
| 2015/0151984 A1* | 6/2015 | Han | B01D 71/68 |
| | | | 210/490 |

FOREIGN PATENT DOCUMENTS

CN     1509805 A  *  7/2004

OTHER PUBLICATIONS

Zhang, Novel chemical surface modification to enhance hydrophobicity of polyamide-imide (PAI) hollow fiber membranes, May 9, 2011, p. 1-10.*

(Continued)

*Primary Examiner* — Hayden Brewster
(74) *Attorney, Agent, or Firm* — Seed IP Law Group LLP

(57) ABSTRACT

The invention relates to hydrophobic hollow fiber membranes, and in particular, to hydrophobic organic-inorganic composite hollow fiber membranes. Methods for forming the hydrophobic organic-inorganic composite hollow fiber membranes are also disclosed. The hydrophobic organic-inorganic composite hollow fiber membranes may be used in membrane contactor applications such as gas-liquid (G-L) contactor and liquid-liquid (L-L) contactor processes. Applications for G-L membrane contactors include gas streams purification (gas absorption), water ozonation, and water deoxygenation. Applications for L-L membrane contactors include direct contact membrane distillation and liquid-liquid extraction.

19 Claims, 20 Drawing Sheets

(51) Int. Cl.
| | |
|---|---|
| *B01D 69/02* | (2006.01) |
| *B01D 69/08* | (2006.01) |
| *B01D 69/12* | (2006.01) |
| *B01D 69/14* | (2006.01) |
| *B01D 71/02* | (2006.01) |
| *B01D 71/34* | (2006.01) |

(52) U.S. Cl.
CPC .......... *B01D 69/02* (2013.01); *B01D 69/088* (2013.01); *B01D 69/125* (2013.01); *B01D 69/148* (2013.01); *B01D 71/025* (2013.01); *B01D 71/027* (2013.01); *B01D 71/643* (2022.08); *B01D 71/34* (2013.01); *B01D 2323/36* (2013.01); *B01D 2325/38* (2013.01)

(58) Field of Classification Search
CPC ............ B01D 2313/06; B01D 2313/08; B01D 2313/14; B01D 2315/06; B01D 2319/04; B01D 2321/18; B01D 2321/185; B01D 2323/04; B01D 2323/30; B01D 2323/40; B01D 2325/08; B01D 2325/18; B01D 2325/24; B01D 61/002; B01D 61/18; B01D 63/00; B01D 63/08; B01D 63/081; B01D 63/082; B01D 63/103; B01D 65/00; B01D 65/003; B01D 65/02; B01D 65/08; B01D 67/0006; B01D 67/0079; B01D 67/0088; B01D 69/02; B01D 69/125; B01D 69/148; B01D 71/06; B01D 71/08; B01D 71/30; B01D 71/32; B01D 71/34; B01D 71/38; B01D 71/48; B01D 71/56; B01D 71/60; B01D 71/62; B01D 71/641; B01D 67/00793; B01D 67/00931; B01D 69/088; B01D 71/025; B01D 71/027; B01D 71/643; B01D 2323/36; B01D 2325/38; B01D 2315/22; C02F 2103/023; C02F 5/12; C02F 5/10; C02F 1/444; C02F 2101/10; C02F 2103/08; C02F 2103/32; C02F 2103/325; C02F 2103/327; C02F 2103/365; C02F 2209/06; C02F 5/14; C02F 1/285; C02F 1/44; C02F 1/441; C02F 1/442; C02F 1/445; C02F 1/68; C02F 2101/101; C02F 2101/105; C02F 2101/34; C02F 2103/18; C02F 2103/28; C02F 2303/08; C02F 2303/22; C02F 2305/00; C02F 3/1273; C02F 3/201; C02F 5/145; C09K 5/10; C09K 8/54; C11D 3/0073; C11D 3/2075; C11D 11/0023; C11D 1/662; C11D 3/0036; C11D 3/042; C11D 3/044; C11D 3/168; C11D 3/185; C11D 3/2086; C11D 3/28; C11D 3/30; C11D 3/33; C11D 3/3427; C11D 3/3472; C11D 3/361; C11D 3/364; C11D 3/3719; C11D 3/3788; C11D 7/08; C11D 7/265; C23F 11/173; C23F 11/10; C23F 11/12; C23F 11/128; C23F 11/167; C23F 14/02; A23C 7/02; C08F 283/04; C08G 69/10; C08G 73/0233; C08G 73/1092; C13B 30/021; D21C 9/08; D21H 17/10; D21H 17/43; D21H 17/66; D21H 21/02; Y02W 10/10; Y02W 10/15
USPC .................................................. 210/500.23
See application file for complete search history.

(56) References Cited

OTHER PUBLICATIONS

Molyneus, Permeation of gases through microporous silica hollow-fiber membranes: Application of the transition-site model, Sep. 29, 2007, p. 1, 2, 7, 11, 12.*

He, Preparation of Porous Hollow Fiber Membranes with a Triple-Orifice Spinneret, May 14, 2002, p. 1-7.*

Hendren, Surface modification of nanostructured ceramic membranes for direct contact membrane distillation, Sep. 18, 2008, p. 1-2, 9-10.*

Romero, Influence of silica and coupling agent loading on thermal, morphological and mechanical properties of hybrid membranes, Springer-Verlag Berlin Heidelberg, Nov. 1, 2012, pp. 1-13 (Year: 2013).*

Si, Silica nanofibrous membranes with ultra-softness and enhanced tensile strength for thermal insulation, Oct. 13, 2014, p. 1-6 (Year: 2014).*

Romero, Influence of silica and coupling agent loading on thermal, morphological and mechanical properties of hybrid membranes, Nov. 1, 2012 (Year: 2012).*

Gu, Asymmetric Organic-Inorganic Hybrid Membrane Formation via Block Copolymer-Nanoparticle Co-Assembly, Jul. 29, 2013 (Year: 2013).*

J. Mater. Chem., Anti-biofouling organic-inorganic hybrid membrane for water treatment, 2012, 22, 1834 (Year: 2011).*

Cunha et al, Preparation and characterization of novel highly omniphobic cellulose fibers organic-inorganic hybrid materials, Jan. 15, 2010, p. 1-9 (Year: 2010).*

Cunha, Preparation and characterization of novel highly omniphobic cellulose fibers organic-inorganic hybrid materials, Jan. 15, 2010, p. 1-10 (Year: 2010).*

Atchariyawut et al., "Effect of Membrane Structure on Mass-Transfer in the Membrane Gas-Liquid Contacting Process Using Microporous PVDF Hollow Fibers," *Journal of Membrane Science* 285:272-281, 2006.

Atchariyawut et al., "Separation of $CO_2$ from $CH_4$ by Using Gas-Liquid Membrane Contacting Process," *Journal of Membrane Science* 304:163-172, 2007.

Atchariyawut et al., "Mass Transfer Study and Modeling of Gas-Liquid Membrane Contacting Process by Multistage Cascade Model for $CO_2$ Absorption," *Separation and Purification Technology* 63:15-22, 2008.

Bakeri et al., "Development of High Performance Surface Modified Polyetherimide Hollow Fiber Membrane for Gas-Liquid Contacting Processes," *Chemical Engineering Journal* 198-199:327-337, 2012.

Chung et al., "Effect of Shear Rate Within the Spinneret on Morphology, Separation Performance and Mechanical Properties of Ultrafiltration Polyethersulfone Hollow Fiber Membranes," *Chemical Engineering Science* 55:1077-1091, 2000.

Fang et al., "Hydrophobic Porous Alumina Hollow Fiber for Water Desalination via Membrane Distillation Process," *Journal of Membrane Science* 403-404:41-46, 2012.

Feng et al., "Diverse Morphologies of PVDF Hollow Fiber Membranes and Their Performance Analysis as Gas/Liquid Contactors," *Journal of Applied Polymer Science* 119:1259-1267, 2011.

Franken et al., "Wetting Criteria for the Applicability of Membrane Distillation," *Journal of Membrane Science* 33:315-328, 1987.

Irzh et al., "Rapid Deposition of Transparent Super-Hydrophobic Layers on Various Surfaces Using Microwave Plasma," *Applied Materials & Interfaces* 3:4566-4572, 2011.

Khaisri et al., "A Mathematical Model for Gas Absorption Membrane Contactors that Studies the Effect of Partially Wetted Membranes," *Journal of Membrane Science* 347:228-239, 2010.

Kumar et al., "New Absorption Liquids for the Removal of $CO_2$ from Dilute Gas Streams Using Membrane Contactors," *Chemical Engineering Science* 57:1639-1651, 2002.

Li et al., "What Do We Need for a Superhydrophobic Surface? A Review on the Recent Progress in the Preparation of Superhydrophobic Surfaces," *Chem. Soc. Rev.* 36:1350-1368, 2007.

(56) References Cited

OTHER PUBLICATIONS

Loh et al., "Effects of Additives and Coagulant Temperature on Fabrication of High Performance PVDF/Pluronic F127 Blend Hollow Fiber Membranes via Nonsolvent Induced Phase Separation," *Chinese Journal of Chemical Engineering* 20(1):71-79, 2012.

Mansourizadeh et al., "Preparation of Polyvinylidene Fluoride Hollow Fiber Membranes for $CO_2$ Absorption Using Phase-Inversion Promoter Additives," *Journal of Membrane Science* 355:200-207, 2010.

Mansourizadeh et al., "Effect of Additives on the Structure and Performance of Polysulfone Hollow Fiber Membranes for $CO_2$ Absorption," *Journal of Membrane Science* 348:260-267, 2010.

Rangwala, "Absorption of Carbon Dioxide into Aqueous Solutions Using Hollow Fiber Membrane Contactors," *Journal of Membrane Science* 112:229-240, 1996.

Setiawan et al., "Explorations of Delamination and Irregular Structure in Poly(amide-imide)-Polyethersulfone Dual Layer Hollow Fiber Membranes," *Journal of Membrane Science* 423-424:73-84, 2012.

Shi et al., "Fabrication of Poly(vinylidene fluoride-*co*-hexafluropropylene) (PVDF-HFP) Asymmetric Microporous Hollow Fiber Membranes," *Journal of Membrane Science* 305:215-225, 2007.

Stöber et al., "Controlled Growth of Monodisperse Silica Spheres in the Micron Size Range," *Journal of Colloid and Interface Science* 26:62-69, Aug. 1968.

Tang et al., "Effect of Spinning Conditions on the Structure and Performance of Hydrophobic PVDF Hollow Fiber Membranes for Membrane Distillation," *Desalination* 287:326-339, 2012.

Wang et al., "Influence of Membrane Wetting on $CO_2$ Capture in Microporous Hollow Fiber Membrane Contactors," *Separation and Purification Technology* 46:33-40, 2005.

Wang et al., "One-Step Coating of Fluoro-Containing Silica Nanoparticles for Universal Generation of Surface Superhydrophobicity," *Chem. Commun.* 7:877-879, 2008.

Wang et al., "Morphological Architecture of Dual-Layer Hollow Fiber for Membrane Distillation with Higher Desalination Performance," *Water Research* 45:5489-5500, 2011.

Xu et al., "Poly(vinyl chloride) (PVC) Hollow Fiber Ultrafiltration Membranes Prepared from PVC/Additives/Solvent," *Journal of Membrane Science* 208:203-212, 2002.

Yan et al., "Experimental Study on the Separation of $CO_2$ from Flue Gas Using Hollow Fiber Membrane Contactors Without Wetting," *Fuel Processing Technology* 88:501-511, 2007.

Yang et al., "Performance Improvement of PVDF Hollow Fiber-Based Membrane Distillation Process," *Journal of Membrane Science* 369:437-447, 2011.

Zhang et al., "Novel Chemical Surface Modification to Enhance Hydrophobicity of Polyamide-imide (PAI) Hollow Fiber Membranes," *Journal of Membrane Science* 380:241-250, 2011.

Zhang et al., "Novel Single-Step Hydrophobic Modification of Polymeric Hollow Fiber Membranes Containing Imide Groups: Its Potential for Membrane Contactor Application," *Separation and Purification Technology* 101:76-84, 2012.

Zhang et al., "Fabrication of Novel Polyetherimide-Fluorinated Silica Organic-Inorganic Composite Hollow Fiber Membranes Intended for Membrane Contactor Application," *Journal of Membrane Science* 443:170-180, 2013.

Zhang et al., "Current Status and Development of Membranes for $CO_2/CH_4$ Separation: A Review," *International Journal of Greenhouse Gas Control* 12:84-107, 2013.

Zhang et al., "Novel Method for Incorporating Hydrophobic Silica Nanoparticles on Polyetherimide Hollow Fiber Membranes for $CO_2$ Absorption in a Gas-Liquid Membrane Contactor," *Journal of Membrane Science* 452:379-389, 2014.

\* cited by examiner

Hydrolysis (complete hydrolysis assumed for simplicity)

Polycondensation / Fluorination (stoichiometric not balanced)

HYDROPHOBIC ORGANIC-INORGANIC COMPOSITE HOLLOW FIBER MEMBRANE AND METHOD OF FORMING THE SAME

CROSS-REFERENCE TO RELATED APPLICATION

This application claims the benefit of priority of U.S. Provisional Patent Application No. 61/869,222, filed Aug. 23, 2013, the contents of which being hereby incorporated by reference in its entirety for all purposes.

TECHNICAL FIELD

The invention relates to hydrophobic hollow fiber membranes, and in particular, to hydrophobic organic-inorganic composite hollow fiber membranes. Methods for forming the hydrophobic organic-inorganic composite hollow fiber membranes are also disclosed. The hydrophobic organic-inorganic composite hollow fiber membranes may be used in membrane contactor applications such as gas-liquid (G-L) contactor and liquid-liquid (L-L) contactor processes. Applications for G-L membrane contactors include gas streams purification (gas absorption), water ozonation, and water deoxygenation. Applications for L-L membrane contactors include direct contact membrane distillation and liquid-liquid extraction.

BACKGROUND

Gas-liquid membrane contactor (GLMC) is increasingly seen as a promising alternative to existing contacting equipments such as packed towers or bubble columns. In particular, $CO_2$ capture from flue gas or biogas using membrane contactor has attracted intensive interest in recent years. In a membrane contactor, a gas stream and a liquid solution normally flow counter-currently at both sides of the membrane. If the gas stream contains $CO_2$, for example, $CO_2$ capture is achieved when $CO_2$ transports through the microporous membrane matrix and is absorbed by the liquid absorbent. The microporous membrane serves as a non-selective barrier to provide an interface between the gas and liquid phases. Therefore, membrane contactor is expected to have potential to overcome the disadvantages of conventional contacting equipment because of its unique feature of non-dispersive gas-liquid contact that allows manipulating the two phases separately. In addition, its compact modular structure provides the flexibility for scale up or down with much larger gas-liquid interface on a small foot-print, leading to a significantly-enhanced mass transfer efficiency. Moreover, the mass transfer is based on concentration gradient rather than pressure difference as the driving force. Hence, membrane contactor is able to operate at nearly atmospheric pressure, which allows for a low-cost construction of the system.

However, no commercial $CO_2$ removal process using GLMC technology is presently in operation. The main technical barrier is the lack of availability of desirable membranes. The essential properties of the membranes for contactor applications include: high hydrophobicity, high surface porosity with small pore size, low mass transfer resistance, and high chemical resistance to the liquid absorbents to ensure long-term high performance of the system [1]. In particular, the non-wetted mode of operation is preferred, i.e., the membrane pores are filled with gas to minimize the mass transfer resistance in the membrane. It has been reported that once the membrane is getting fully wetted or even partially wetted, the mass transfer resistance increases significantly due to the stagnant liquid phase in the membrane pores [2]. Even a less than 2% margin wetting could cause an increase in a membrane resistance as high as 60% of the total mass transfer resistance [3].

For a given liquid absorbent, the minimum pressure or breakthrough pressure to be applied on the liquid phase to enter the membrane pores can be estimated by Young-Laplace equation [4,5]:

$$\Delta p = \frac{4\sigma_l \cos\theta}{d_{max}} \quad (1)$$

where $\sigma_l$ is the liquid surface tension, $\theta$ is the contact angle between the liquid and membrane surface, and $d_{max}$ is the maximum pore diameter in the microporous membrane. As can be seen from Equation (1), the factors affecting the value of breakthrough pressure are liquid surface tension, membrane hydrophobicity and the maximum membrane pore size. A high breakthrough pressure requires the membrane to be as hydrophobic as possible with small pore size and narrow pore size distribution.

Commonly used hydrophobic materials include polytetrafluoroethylene (PTFE), polypropylene (PP), polyethylene (PE), and polyvinylidene fluoride (PVDF) as well as the co-polymer of poly(vinylidene fluoride-co-hexafluropropylene) (PVDF-HFP). Except for the PTFE membrane, however, most of the hydrophobic membranes are not able to maintain long-term absorption performance due to either larger pore sizes or less hydrophobicity caused by the chemical attacks of the absorbents used. Therefore, the development of highly hydrophobic and chemical resistant membranes with optimized substrate structure to avoid wetting has become a critical issue to facilitate membrane contactor practical application in $CO_2$ separation.

SUMMARY

Membrane pore size is usually limited by the concern of pore wetting when fabricating hollow fiber membranes for contactor applications. It is herein disclosed methods for forming organic hollow fiber membrane substrates with high surface porosity and large pore sizes in the outer skin layer, followed by the inorganic nanoparticles incorporation to make the organic hollow fiber membrane surface highly hydrophobic and chemical resistant to prevent the pores from wetting caused by the large pore sizes. As a result, the highly hydrophobic composite hollow fiber membrane was able to outperform conventional polymeric hydrophobic membrane in terms of superior gas absorption flux and outstanding long term stability, suggesting that the formation of organic-inorganic composite hollow fiber membranes is an effective way to enhance the feasibility of membrane contactor processes for practical applications.

Thus, in one aspect of the invention, there is provided a method for forming an organic-inorganic composite hollow fiber membrane, wherein the composite hollow fiber membrane comprises an organic hollow fiber membrane having hydrophobic inorganic nanoparticles incorporated therein. The method comprises the steps of:
(I) contacting an organic hollow fiber membrane with an aminosilane solution to obtain a silanol-functionalized organic hollow fiber membrane; and
(IIA) contacting the silanol-functionalized organic hollow fiber membrane with a solution containing inorganic nanoparticles to obtain an inorganic nanoparticle-functionalized organic hollow fiber membrane and further contacting the inorganic nanoparticle-functionalized organic hollow fiber membrane with a solution containing hydrophobic compound molecules to obtain an organic-inorganic composite hollow fiber membrane.

In another aspect of the invention, there is provided a method for forming an organic-inorganic composite hollow fiber membrane, wherein the composite hollow fiber membrane comprises an organic hollow fiber membrane having hydrophobic inorganic nanoparticles incorporated therein. The method comprises the steps of:
 (I) contacting an organic hollow fiber membrane with an aminosilane solution to obtain a silanol-functionalized organic hollow fiber membrane; and
 (IIB) contacting the silanol-functionalized organic hollow fiber membrane with a solution containing a mixture of inorganic nanoparticles and hydrophobic compound molecules to obtain an organic-inorganic composite hollow fiber membrane.

In yet another aspect of the invention, there is provided a method for forming an organic-inorganic composite hollow fiber membrane, wherein the composite hollow fiber membrane comprises an organic hollow fiber membrane having inorganic nanoparticles incorporated therein. The method comprises the steps of:
 (I) contacting an organic hollow fiber membrane with an aminosilane solution to obtain a silanol-functionalized organic hollow fiber membrane; and
 (IIC) contacting the silanol-functionalized organic hollow fiber membrane with a solution containing inorganic nanoparticles to obtain an inorganic nanoparticle-functionalized organic hollow fiber membrane, thereby forming the composite hollow fiber membrane.

In a further aspect of the invention, an organic-inorganic composite hollow fiber membrane, wherein the composite hollow fiber membrane comprises an organic hollow fiber membrane having inorganic nanoparticles incorporated therein, obtained from any one of the presently disclosed methods is provided.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

Figure 1A:
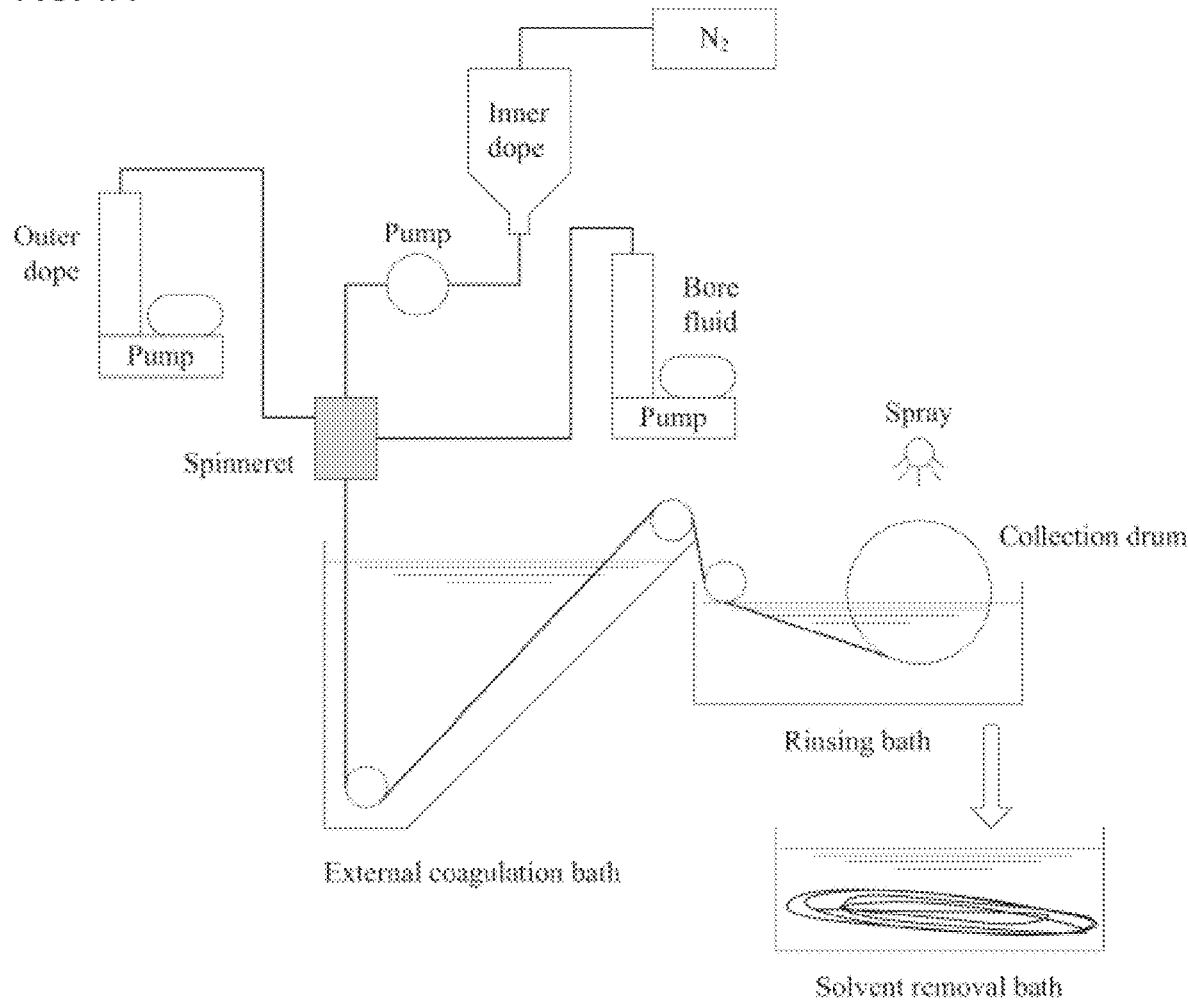
FIG. 1A shows a schematic diagram of a hollow fiber spinning line and FIG. 1B shows the cross-section view of a triple-orifice spinneret used in Example 1.

The following detailed description refers to the accompanying drawings that show, by way of illustration, specific details and embodiments in which the invention may be practised. These embodiments are described in sufficient detail to enable those skilled in the art to practise the invention. Other embodiments may be utilized and changes may be made without departing from the scope of the invention. The various embodiments are not necessarily mutually exclusive, as some embodiments can be combined with one or more other embodiments to form new embodiments.

Present invention relates to hydrophobic hollow fiber membranes, and in particular, to hydrophobic organic-inorganic composite hollow fiber membranes. Methods for forming the hydrophobic organic-inorganic composite hollow fiber membranes are also disclosed. The hydrophobic organic-inorganic composite hollow fiber membranes may be used in membrane contactor applications such as gas-liquid (G-L) contactor and liquid-liquid (L-L) contactor processes. Applications for G-L membrane contactors include gas streams purification (gas absorption), water ozonation, and water deoxygenation. Applications for L-L membrane contactors include direct contact membrane distillation and liquid-liquid extraction.

The present highly hydrophobic organic-inorganic composite hollow fiber membranes offer following advantages:

The incorporation of an inorganic layer on top of the membrane surface not only offers high hydrophobicity, but also would protect the polymeric substrate from the attacks of chemical absorbents, affording the membrane a longer lifespan.

Present invention offers a novel approach to produce the organic-inorganic composite hollow fiber membranes which combines the advantages of both polymeric and inorganic membranes. The organic membrane substrate exhibited an extremely open and porous outer skin layer with cellular structure. The inorganic nanoparticles were embedded deeply in this type of surface structure through both chemical and physical interactions Thus, in one aspect of the invention, there is provided a method for forming an organic-inorganic composite hollow fiber membrane, wherein the composite hollow fiber membrane comprises an organic hollow fiber membrane having hydrophobic inorganic nanoparticles incorporated therein. The method comprises the steps of:
- (I) contacting an organic hollow fiber membrane with an aminosilane solution to obtain a silanol-functionalized organic hollow fiber membrane; and
- (IIA) contacting the silanol-functionalized organic hollow fiber membrane with a solution containing inorganic nanoparticles to obtain an inorganic nanoparticle-functionalized organic hollow fiber membrane and further contacting the inorganic nanoparticle-functionalized organic hollow fiber membrane with a solution containing hydrophobic compound molecules to obtain an organic-inorganic composite hollow fiber membrane.

In another aspect of the invention, there is provided a method for forming an organic-inorganic composite hollow fiber membrane, wherein the composite hollow fiber membrane comprises an organic hollow fiber membrane having hydrophobic inorganic nanoparticles incorporated therein. The method comprises the steps of:
- (I) contacting an organic hollow fiber membrane with an aminosilane solution to obtain a silanol-functionalized organic hollow fiber membrane; and
- (IIB) contacting the silanol-functionalized organic hollow fiber membrane with a solution containing a mixture of inorganic nanoparticles and hydrophobic compound molecules to obtain an organic-inorganic composite hollow fiber membrane.

In various embodiments, the organic hollow fiber membrane comprises an imide-containing polymer or copolymer.

Examples of suitable imide-containing polymer or copolymer may include, but is not limited to, polyetherimide (PEI), poly(amide-imide) (PAI), polyimide (PI), and co-polyimide of 3,3'-4,4'-benzophenone tetracarboxylic dianhydride (BTDA)-toulene diisocyanate (TDI)/methylene diisocyanate (MDI) (BTDA-TDI/MDI).

In preferred embodiments, the organic hollow fiber membrane is a PEI hollow fiber membrane.

Methods for forming organic hollow fiber membranes, such as PEI hollow fiber membranes, are known to persons skilled in the art. For example, the organic hollow fiber membrane may be formed from a dry-jet wet spinning technique. In a preferred embodiment, the spinning technique comprises a triple-orifice spinneret system as described in Example 1 whereby fabrication of dual layer hollow fibers using the triple-orifice spinneret has been reported in details in "Explorations of delamination and irregular structure in poly(amide-imide)-polyethersulfone dual layer hollow fiber membranes" by L. Setiawan et al. [6], the contents of which are herein incorporated in its entirety.

In step (I) the organic hollow fiber membrane is contacted with an aminosilane solution to obtain a silanol-functionalized organic hollow fiber membrane. In various embodiments, the aminosilane solution may include, not is not limited to, (3-aminopropyl)trimethoxysilane (APTMS), (3-aminopropyl)triethoxysilane (APTES), or (4-aminobutyl)triethoxysilane (ABTES).

In a preferred embodiment, the organic hollow fiber membrane is contacted with APTMS solution to obtain the silanol-functionalized organic hollow fiber membrane.

The inorganic nanoparticles may themselves be intrinsically hydrophobic. Alternatively, the inorganic nanoparticles may be rendered hydrophobic by coupling or binding to hydrophobic functional groups.

In various embodiments, the inorganic nanoparticles may include, but are not limited to, silica ($SiO_2$), aluminium oxide ($Al_2O_3$), and titanium dioxide ($TiO_2$).

In a preferred embodiment, the inorganic nanoparticles are $SiO_2$.

In various embodiments, the inorganic nanoparticles, such as $SiO_2$ nanoparticles, are contacted with a solution containing hydrophobic compound molecules such that the hydrophobic compound molecules impart hydrophobicity to the $SiO_2$ nanoparticles.

For example, the hydrophobic compound molecules may include, but are not limited to, molecules of octadecyltrimethoxysilane (OdTMS), phenyltriethoxysilane (PhTES) 1H,1H,2H,2H-perfluorooctylethoxysilane (FAS), 1H,1H, 2H,2H-perfluorodecyltriethoxysilane (PFTS), and perfluoropolyether.

In a preferred embodiment, the hydrophobic compound is PFTS.

In one specific embodiment, the composite hollow fiber membrane is a PEI hollow fiber membrane having fluorinated $SiO_2$ nanoparticles incorporated therein, the composite hollow fiber membrane is obtained from a method described herein.

Another aspect of the disclosure relates to an organic-inorganic composite hollow fiber membrane, wherein the composite hollow fiber membrane comprises an organic hollow fiber membrane having hydrophobic inorganic nanoparticles incorporated therein. The composite hollow fiber membrane may be obtained from a method comprising the steps of:

(I) contacting an organic hollow fiber membrane with an aminosilane solution to obtain a silanol-functionalized organic hollow fiber membrane; and (IIA) contacting the silanol-functionalized organic hollow fiber membrane with a solution containing inorganic nanoparticles to obtain an inorganic nanoparticle-functionalized organic hollow fiber membrane and further contacting the inorganic nanoparticle-functionalized organic hollow fiber membrane with a solution containing hydrophobic compound molecules to obtain an organic-inorganic composite hollow fiber membrane, or (IIB) contacting the silanol-functionalized organic hollow fiber membrane with a solution containing a mixture of inorganic nanoparticles and hydrophobic compound molecules to obtain an organic-inorganic composite hollow fiber membrane.

While the above discussion describes preferred embodiments whereby the organic-inorganic composite hollow fiber membrane is rendered hydrophobic by the inorganic nanoparticles incorporated therein, in certain other embodiments and applications the organic-inorganic composite hollow fiber membrane need not to be so.

Therefore, in yet another aspect of the invention, there is provided a method for forming an organic-inorganic composite hollow fiber membrane, wherein the composite hollow fiber membrane comprises an organic hollow fiber membrane having inorganic nanoparticles incorporated therein. The method comprises the steps of:

(I) contacting an organic hollow fiber membrane with an aminosilane solution to obtain a silanol-functionalized organic hollow fiber membrane; and (IIC) contacting the silanol-functionalized organic hollow fiber membrane with a solution containing inorganic nanoparticles to obtain an inorganic nanoparticle-functionalized organic hollow fiber membrane, thereby forming the composite hollow fiber membrane.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

In order that the invention may be readily understood and put into practical effect, particular embodiments will now be described by way of the following non-limiting examples.

EXAMPLES

Example 1

A highly hydrophobic organic-inorganic composite hollow fiber membrane based on imide-contained organic membrane substrates incorporated with fluorinated inorganic nanoparticles (NPs) was successfully developed for the application of gas-liquid membrane contactor (GLMC). The organic substrate was made by phase inversion method via dry-jet wet spinning technique using a triple-orifice spinneret with solvent and dope co-extrusion from the spinneret simultaneously. The unique feature of imide-contained organic membranes was utilized, that is, the imide group in the polymer chain can react with amine functionalized silane coupling agent, allowing the silanol groups to be generated on the membrane surface. The silanol groups served as a bridge link between the membrane substrate and the NPs that were formed in the NPs precursor solution through polycondensation reaction. Thus an inorganic layer was formed on the membrane surface. A further step of fluorination of NPs was taken place to make the composite membrane highly hydrophobic.

The composite hollow fiber membranes developed in this Example showed the advancing contact angle value of 123.3°, receding contact angle value of 107.2°, and contact angle hysteresis of only 15.9°, indicating the high water resistant property. The composite membrane also exhibited a higher rigidity property compared with the original PEI substrate. The $CO_2$ absorption flux of the composite membranes was investigated in both physical and chemical absorptions in a gas-liquid membrane contactor system. The membrane contactor showed a stable performance throughout the 60 days long-term operation using a 2M sodium taurinate aqueous solution as the liquid absorbent.

Materials

The membrane material, polymer PEI, commercially known as Ultem® 1000, was purchased from GE. NMP (499.5%, CAS #872-50-4, Merck) was used as a solvent. Lithium chloride (LiCl, anhydrous, CAS #7447-41-8, MP Biomed) was used as the membrane pore former. (3-Aminopropy)trimethoxysilane (APTMS, 97%, CAS #13822-56-5, Aldrich), tetraethylorthosilicate (TEOS, Z99%, CAS #78-10-4, Merck) and 1H,1H,2H,2H-perfluorodecyltriethoxysilane (PFTS, 97%, CAS #101947-16-4, Aldrich) were used. Iso-propanol (IPA, 99.9%, CAS

67-63-0, Merck), ammonium (26% NH3·H2O, Merck), ethanol (CAS #64-17-5, Merck) and n-hexane (CAS #110-54-3, Merck) were used for preparing the solutions. Milli-Q deionized water was used in all aqueous solutions (18 MΩ/cm). Taurine ($C_2H_7NO_3S$, 99%, CAS #107-35-7, Acros) and sodium hydroxide (NaOH, CAS #1310-73-2, Merck) were used to prepare the 2M sodium taurinate solution as the $CO_2$ absorbent used in the membrane contactor. All the reagents were used as received.

The fabrication of the highly hydrophobic organic-inorganic composite hollow fibers includes the following two steps:

Hollow Fiber Membranes Preparation by Using a Triple-Orifice Spinneret

Figure 1B:
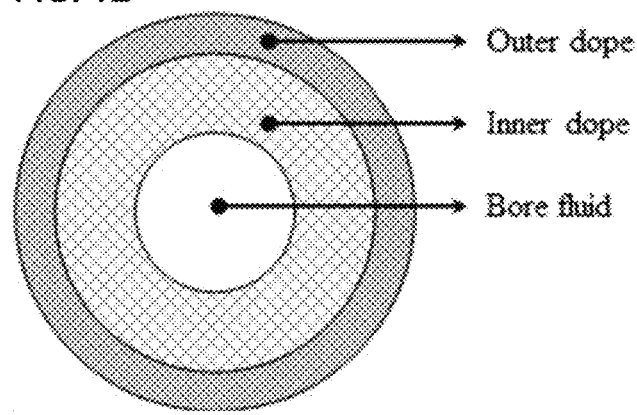

In recent years, the triple-orifice spinneret has been developed mainly for fabricating dual layer hollow fiber membranes. FIG. 1A shows a schematic diagram of a hollow fiber spinning line for hollow fiber membranes fabrication and FIG. 1B shows the cross-section view of a triple-orifice spinneret. Fabrication of dual layer hollow fibers using the triple-orifice spinneret has been reported in details in "Explorations of delamination and irregular structure in poly(amide-imide)-polyethersulfone dual layer hollow fiber membranes" by L. Setiawan et al. [6]. Basically, the bore fluid, the first dope solution and the second dope solution as the external liquid were pumped through the inner, middle and outer channels of the spinneret, respectively. In present experiment, the triple-orifice spinneret was used with a solvent as the external liquid flowing in the outer channel and being extruded simultaneously with the dope solution and bore fluid in the spinning process. The discharged flow went through an air gap at a controlled rate before immersing into a coagulation bath. Tap water was used as the external coagulant whilst the mixtures of Milli-Q water and NMP were used as the bore fluid. The nascent hollow fiber was taken up by a roller at a certain velocity and stored in a water bath to remove residual solvent for at least 2 days. A post-treatment was performed to alleviate the membrane shrinkage and pores collapse during drying process at ambient condition. The membranes were immersed in turn into water/propanol (1:1), propanol and propanol/n-hexane (1:1) solutions. Each stage of the solvent exchange lasted 12 h. In this process, water in the membrane pores was gradually replaced with the exchanged liquids, which had a lower surface tension. The membranes were subsequently dried at room temperature prior to the characterization tests and further application.

The hollow fiber substrates were prepared using imide-contained polymer materials dissolved in N-Methyl-2-pyrrolidone (NMP) or dimethylacetamide (DMAc) solvent. The imide-contained polymers can be polyetherimide (PEI), poly(amide-imide) (PAI), polyimide (PI) and co-polyimide (BTDA-TDI/MDI). The concentrations of the polymer are from 8 to 20 wt. %. Water, lithium chloride (LiCl) or poly(ethylene glycol) (PEG) with a concentration ranging from 1 to 10 wt. % is adopted as a non-solvent additive into the dope solution. A mixture of NMP and Milli-Q water of certain weight ratios of between 0/100 and 98/2 is adopted as the bore fluid.

The temperature of the spinneret is controlled between 15° C. and 40° C. The air gap from 0.2 to 20 cm is used. The hollow fibre substrate preferably has an outer diameter of from 200 μm to 1500 μm, more preferably from 400 μm to 1200 μm, and an inner diameter of from 100 μm to 1000 μm, more preferably from 200 μm to 800 μm. The cross-section of the hollow fibers may be circular, square, rectangular or hexagonal, but a circular cross-section is preferred.

Formation of the Highly Hydrophobic Organic-Inorganic Composite Membranes

The imide-contained organic membrane surface is treated by a compound that contains at least one methyl or vinyl silane and at least one amine group. For instance, it could be but not limited to (3-aminopropyl)trimethoxysilane (APTMS), (3-aminopropyl)triethoxysilane (APTES), (4-aminobutyl)triethoxysilane (ABTES).

The formation of the composite membranes is through a sol-gel process by using a NP precursor and a hydrophobic compound. The NP precursor can be but not limited to tetraethyl orthosilicate (TEOS) ($SiO_2$ NPs), sodium silicate ($SiO_2$ NPs), Ti-alkoxide ($TiO_2$ NPs), alumoxanes ($Al_2O_3$ NPs). The hydrophobic compound should contain at least one methyl or vinyl silane, and at least one fluoro, alkyl or phenyl as the hydrophobic group. Thus, the hydrophobic compound can be but not limited to octadecyltrimethoxysilane (OdTMS), phenyltriethoxysilane (PhTES) 1H,1H,2H,2H-perfluorooctylethoxysilane (FAS), 1H,1H,2H,2H-perfluorodecyltriethoxysilane (PFTS), a group of perfluoropolyether materials (Fluorolink®) from Solvay Solexis. The NP precursor and silane hydrophobic compound are used to form NPs and to fluorinate the hydrophilic NPs, respectively.

Figure 2:
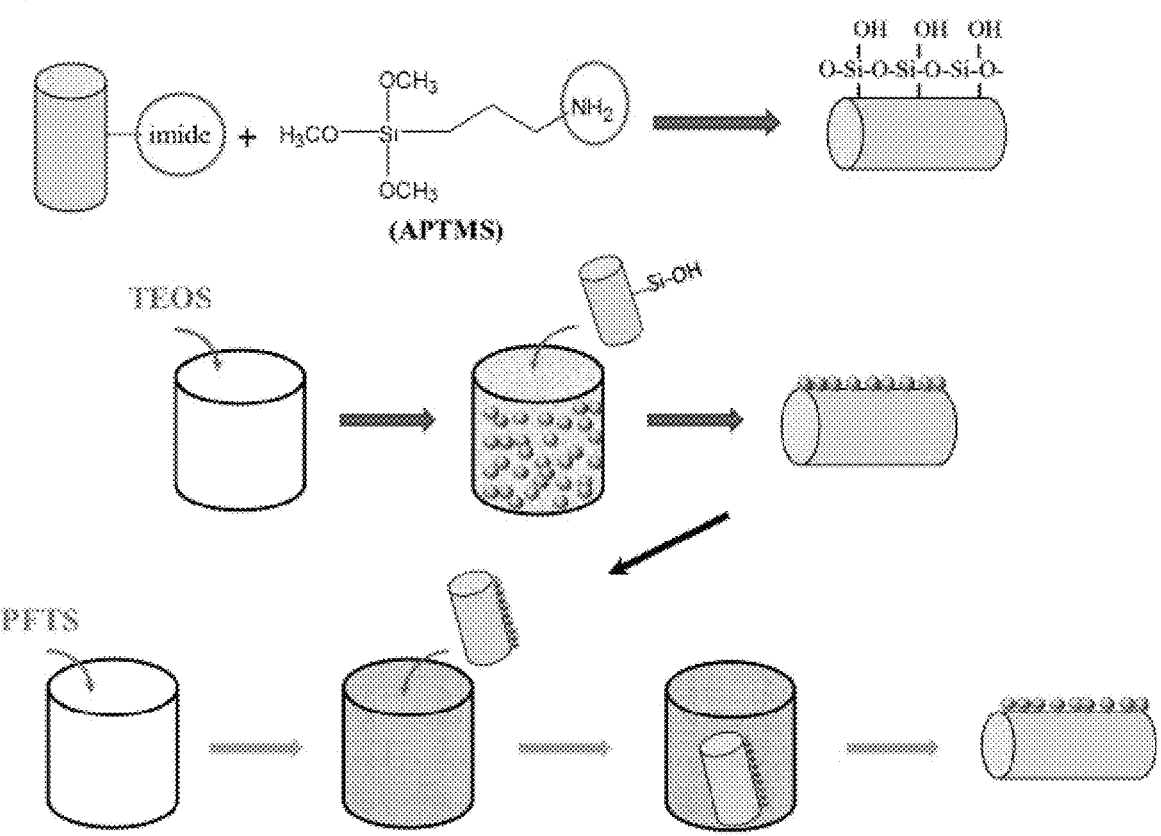
FIG. 2 shows a scheme outlining the formation of the organic-inorganic composite hollow fiber membrane of Example 1.

Taking APTMS, silica and PFTS as an example, the route of forming the composite membrane is shown in FIG. 2. The imide-contained membranes were firstly treated by an amino silane solution containing amine to generate the silanol groups on the membrane surface through the interactions between imide and amine. The reaction was conducted at 50 to 80° C. for 1 to 5 h. The amine treated membranes were then placed in the NPs precursor solution allowing the deposition of NPs on the membrane surface through silanol polycondensation reaction for 1 to 4 h at room temperature. The membranes were placed in the oven at 100 to 150° C. for 0.5 to 2 h. Next, the membranes were further immersed in the hydrophobic compound solution for 1 to 4 h at room temperature for fluorination purpose. Finally, the fluorinated membranes were placed in the oven at 100 to 150° C. for 0.5 to 2 h for curing.

The concentrations of the amino silane aqueous solution (mixture of propanol and Milli-Q water) are from 0.1 to 5.0 wt. %. The concentration of the NPs precursor solution varies from 5 to 30 ml in every 100 ml ethanol. The concentration of the hydrophobic compound is in the range of 0.5 to 5.0 wt. % in n-hexane or propanol.

Fabrication Details of the PEI-f$SiO_2$ Organic-Inorganic Composite Hollow Fiber Membranes Fabrication of PEI Hollow Fiber Substrates Two PEI hollow fiber substrates were fabricated by the dry-jet wet spinning technique. In particularly, PAI-B was made by solvent-dope solution co-extrusion approach using a triple-orifice spinneret. The dope composition and spinning conditions are listed in Table 1.

TABLE 1

| Spinning parameters for PEI hollow fiber substrates. | |
|---|---|
| Parameters | PEI |
| Dope composition (wt. %) | PEI/LiCl/NMP (14/3/83) |
| Dope flow rate (g/min) | 3.78 |
| Outer channel solvent | PAI A: — |
| | PAI B: NMP |
| Solvent flow rate (ml/min) | PAI A: — |
| | PAI B: 1 ml/min |

TABLE 1-continued

Spinning parameters for PEI hollow fiber substrates.

| Parameters | PEI |
|---|---|
| Bore fluid composition (wt. %) | Water/NMP (20/80) |
| Bore fluid flow rate (ml/min) | 3 |
| Length of air gap (cm) | 5 |
| Take-up speed | Free fall |
| External coagulant | Water |
| Spinning temperature(° C.) | 25 |

The fabricated hollow fibers were soaked in tap water for three days and then immersed in turn into water/propanol (1:1), propanol and propanol/n-hexane (1:1) solutions. Each stage of the solvent exchange lasted 12 h. The membranes were then dried in the air and stored at room temperature for characterizations and further use.

Figure 3:
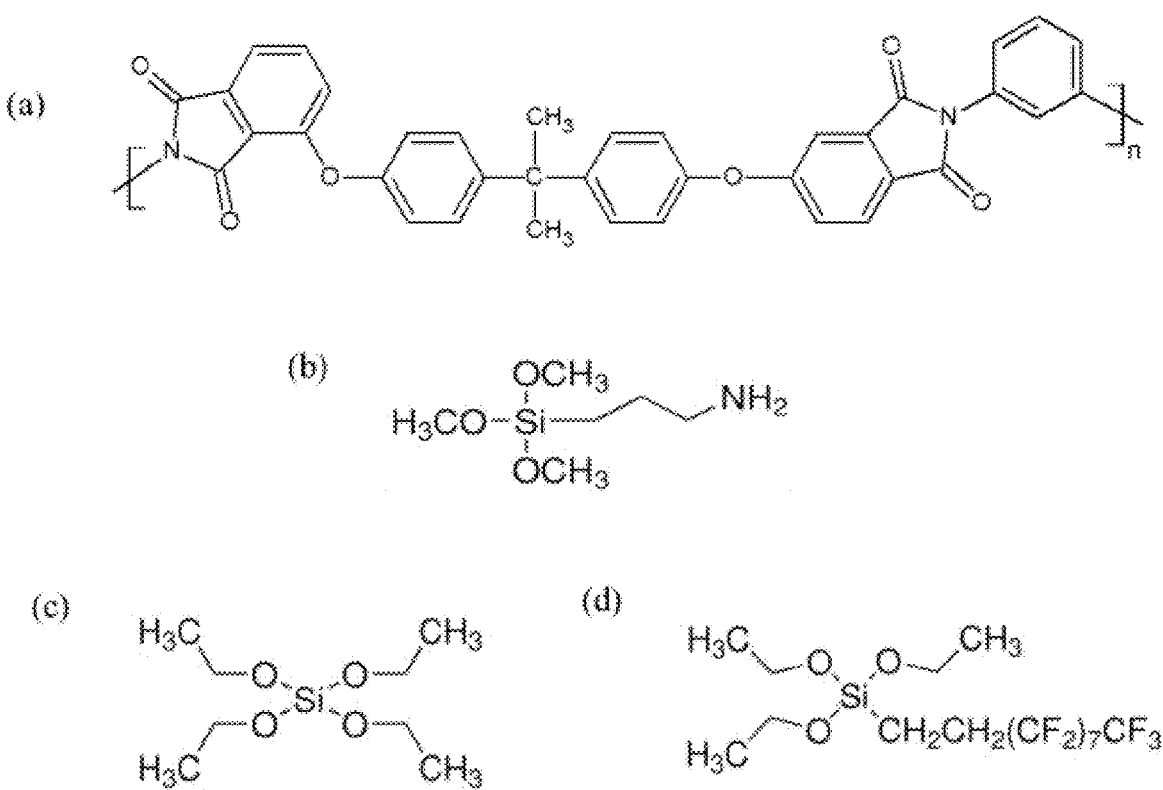
FIG. 3 shows the chemicals used for forming the composite membranes of Example 1: (a) PEI, (b) APTMS, (c) TEOS, and (d) PFTS.

Formation of the PEI-fSiO$_2$ Organic-Inorganic Composite Hollow Fiber Membranes The PEI membranes were immersed in a 2% (wt/vol) APTMS in the mixture of propanol and Milli-Q water (vol 1:1) at the water bath of 70° C. for 3 h to generate silanol groups on the membrane surface. The membranes were then rinsed with abundant amount of distilled water to remove the APTMS residue. The silanol groups served as a bridge link between the PEI substrate and the SiO$_2$ NPs that are generated in the SiO$_2$ precursor solution which was prepared in the next step. The SiO$_2$ NPs precursor solution was prepared based on the well-known Stober method [7]. Briefly, a 20 ml TEOS were dissolved in a 100 ml ethanol solution and mixed well. The solution was added dropwise to another solution containing 24 ml ammonium in a 100 ml ethanol with agitation. The mixture was stirred intensively at room temperature. After stirring for 12 h, the mixture was treated by probe ultrasonication for 20 min to alleviate the SiO$_2$ NPs aggregation in the solution. The APTMS treated PEI membranes were then immersed in the above solution for 2 h with shaking. The silanol groups on the membrane surface reacted with SiO$_2$ NPs through polycondensation reaction. Subsequently, the membranes were rinsed with abundant ethanol to remove loosely bonded and stacked layers of SiO$_2$ NPs on the membrane surface and placed in an oven at 100° C. for 1 h. Herein, the PEI substrate with nanostructured hydrophilic SiO$_2$ surface was obtained. To get the nanostructured hydrophobic surface, the membranes were further treated by a 2 wt % PFTS in n-hexane at room temperature for 2 h. The PFTS molecules were opt to react with the hydroxyl groups on the membrane surface. The final membranes were then dried in oven at 100° C. for 1 h. The final composite membranes were designated as PEI-fSiO2. The chemicals used are listed in FIG. 3. In Example 2 (to be discussed in later paragraphs), fluorination was done in a single step by mixing TEOS and PFTS together to allow the hydrolysis, polycondensation and fluorination reactions occur simultaneously to generate fSiO2 particles in the solution. In Example 1, fluorination as the final treatment step was favorable to generate a more uniform coverage of PFTS network on the SiO2 layer surface.

Characteristics of the as-Spun PEI Hollow Fiber Substrates

Figure 4:
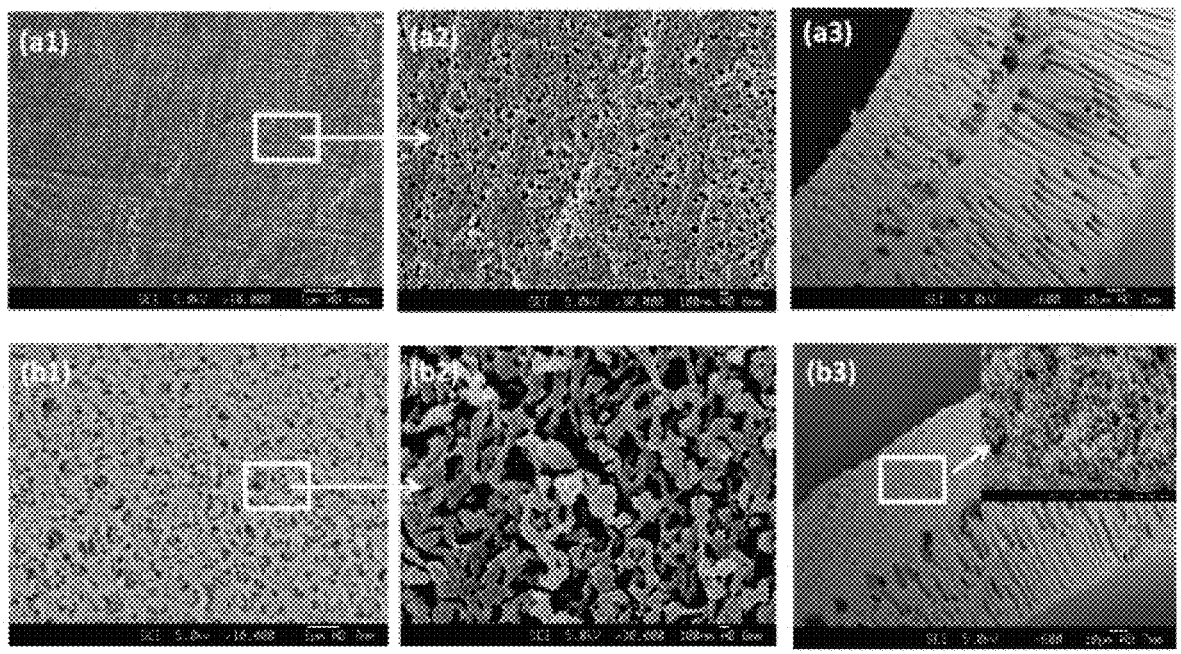
FIG. 4 shows SEM images of the surface and cross-section of the as-spun substrates of Example 1. PEI A: (a1) 10,000×, (a2) 30,000× and (a3) 600×; PEI B: (b1) 10,000×, (b2) 30,000× and (b3) 600×.

The Scanning Electron Microscope (SEM) images of the two as-spun PEI substrates, e.g. PEI A and PEI B are shown in FIG. 4. PEI A was spun by using the standard dry-jet wet spinning process without solvent flowing in the outer channel of the spinneret. PEI B was spun with solvent phase extruding from the spinneret simultaneously with the dope solution. The dope of PEI A went through an air gap after extruded from the spinneret and entered the water bath. A relatively dense skin layer was formed. When NMP was applied in the outer orifice, an extremely open and porous skin layer with a lacy structure was obtained for PEI B. This was because the solvent in the outer channel of the spinneret reduced the outer layer polymer concentration of the dope system and also hindered the solvent exchange process with the coagulant bath, resulting in a loose and open cellular structure in the skin layer.

The cross-section of the PEI A and PEI B are also shown in FIG. 4 (a3) and (b3), respectively. For the PEI A, it can be seen the finger-like structures were developed simultaneously beneath the inner and outer surfaces of the fiber with a thin layer of sponge structure sandwiched in between. This was because of the fast solvent and nonsolvent exchange process so that the dope system gelled and solidified immediately after immersion in water bath which resulted in a membrane with a fine pore skin and finger-like pore structure. On the other hand, the substrate beneath the outer skin layer of the PEI B showed a free and interconnected pore structure. This was because the solvent flowing at the outer layer of the dope solution hindered the inward diffusion of the nonsolvent, leading to the delayed demixing which made the morphology completely different from that of the PEI A. It is worth mentioning that the open cellular surface morphology would effectively reduce the mass transfer resistance, and meanwhile, it also played an important role in the SiO$_2$ NPs incorporation as the NPs were able to be embedded deeply in this type of morphology so that the membrane would hold the NPs through both chemical and physical interactions.

The characteristics of the as-spun PEI A and PEI B substrates in terms of fiber dimension, mean pore size, overall membrane porosity and pure water permeability are summarized in Table 2. Under the same spinning condition, the thickness of PEI B was 25% less than PEI A. The pore size of PEI B was much bigger than that of the PEI A. The PEI B exhibited smaller overall membrane porosity because of the replacement of finger-like structures and macrovoids by the interconnected pores. The pure water flux of the PEI B was almost the same as the PEI A. This was possibly because of the balance between an increased pore size and decreased overall membrane porosity.

TABLE 2

Characteristics of the porous PEI hollow fiber substrates.

| Properties | PEI A | PEI B |
|---|---|---|
| Fiber OD (μm) | 1042 | 966 |
| Fiber ID (μm) | 736 | 737 |
| Fiber wall thickness (μm) | 153 | 115 |
| Fiber mean pore size (μm) | 0.03 | 0.09 |
| Overall membrane porosity (%) | 81.2 | 71.2 |
| Pure water permeability (L/m$^2$ · h · bar) | 662 | 665 |

Characteristics of the PEI-fSiO$_2$ Composite Hollow Fiber Membranes

Confirmation of the Mechanism of Forming the Composite Membranes

Figure 5:
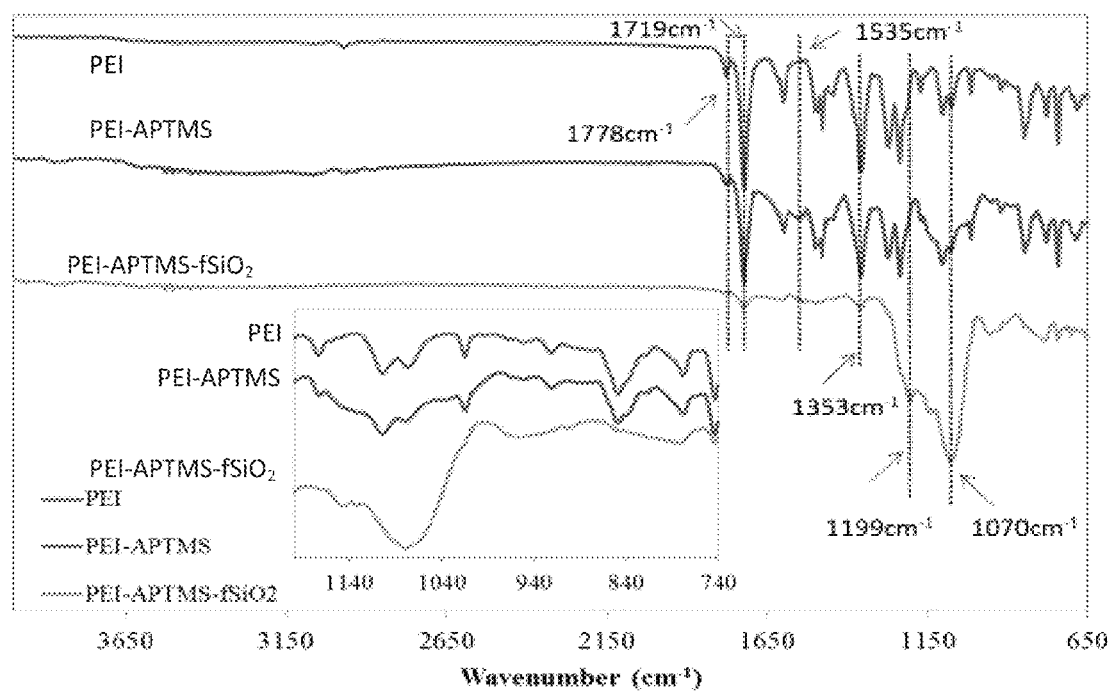
FIG. 5 shows ATR-FTIR spectrum of the original PEI, APTMS modified PEI, PEI-fSiO$_2$ composite hollow fiber membranes of Example 1 (also of Example 2).

The chemical structure of the original PEI membrane, APTMS treated PEI membrane and PEI-fSiO$_2$ composite membrane was examined by Attenuated Total Reflectance-Fourier Transform Infrared Spectroscopy (ATR-FTIR). As can be seen in FIG. 5, the typical imide bands can be observed at 1778 cm$^{-1}$ and 1719 cm$^{-1}$ which correspond to the asymmetric and symmetric C—O stretching of the original PEI membrane. The absorption band at 1353 cm$^{-1}$ is assigned to the bond stretching vibration of C—N—C in phthalimide rings. After APTMS treatment, the intense absorption bands between 1000 cm$^{-1}$ and 1200 cm$^{-1}$ are observed due to asymmetric stretching vibration of siloxane groups (Si—O—Si). The broad peak around 3000-3600 cm$^{-1}$ was due to the stretching of O—H group from the hydrolyzed APTMS. A band at 1535 cm$^{-1}$ appears due to the deformation of N—H moiety which is associated with amide II band, indicating that the phthalimide rings was opened, and imide group transferred successfully to amide through the reaction with APTMS. For the spectrum of fSiO$_2$ modified PEI membranes, the PEI characteristic peaks became less intense which is attributed to the coverage of an inorganic fSiO$_2$ NPs layer on top of the membrane surface. A very intense peak at 1070 cm$^{-1}$ is assigned to the siloxane asymmetric bond stretching of Si—O—Si or Si—O—R groups (R is a hydrocarbon such as —CH$_2$CH$_3$) [8], which proved the existence of SiO$_2$ NPs on the membrane surface. The peak at 1199 cm$^{-1}$ could be due to the C—F stretching from PFTS. The ATR-FTIR spectra confirmed the presence of fSiO$_2$ NPs on the PEI substrate.

Membrane Morphology Observation and Surface Roughness Analysis

Figure 6:
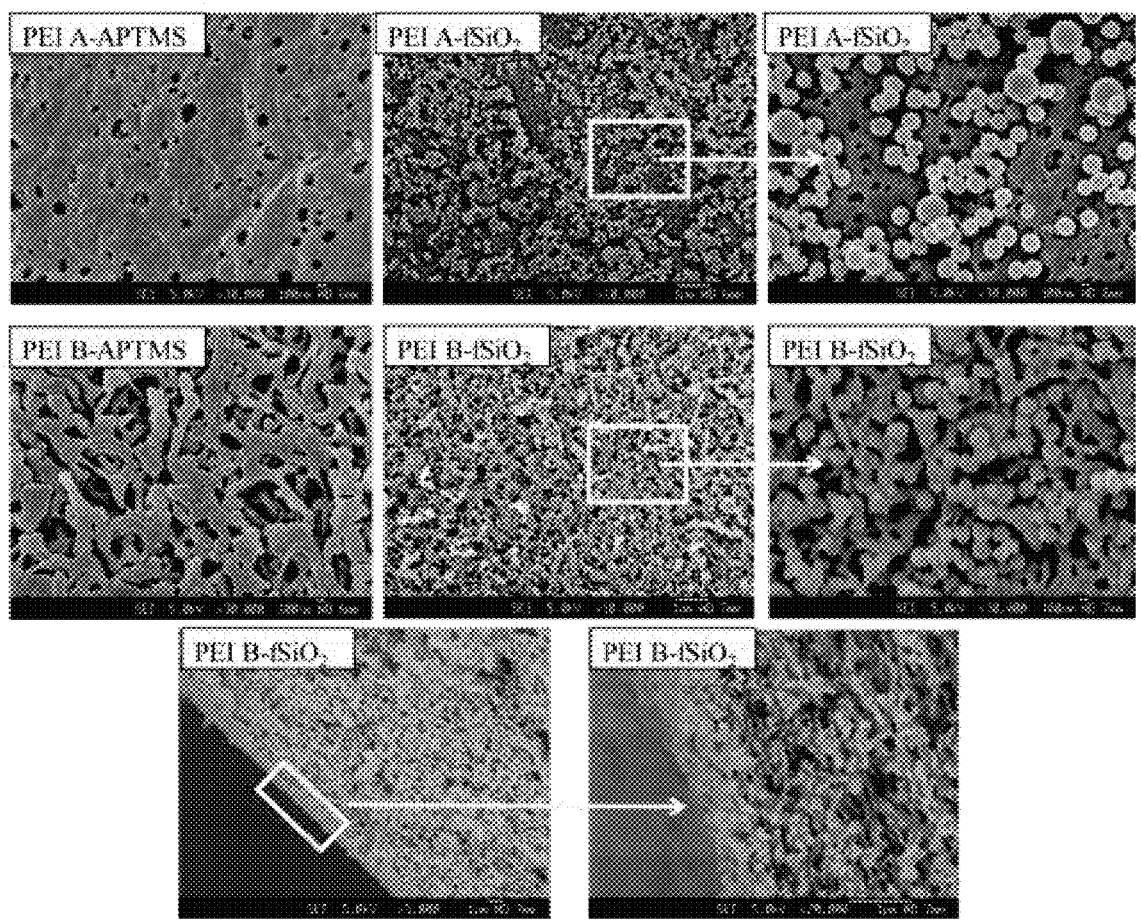
FIG. 6 shows SEM images of the PEI A and PEI B membranes after APTMS treatment (surface, enlarged at 30,000×) and fSiO$_2$ NPs incorporation (surface, enlarged at 10,000× and 30,000× & cross section, enlarged at 5000× and 20,000×) illustrated in Example 1.

FIG. 6 shows the SEM images of the two PEI substrates after APTMS treatment and fSiO$_2$ incorporation. The nanostructured architecture can be observed clearly on the PEI A-fSiO$_2$ and PEI B-fSiO$_2$ membrane surfaces after the incorporation of fSiO$_2$ NPs on the PEI substrates. For PEI A, the surface was denser compared with PEI B and the fSiO$_2$ NPs deposited individually on top of the membrane surface. While for PEI B, the surface was so loose with cellular morphology that the fSiO$_2$ NPs were embedded into the skin layer of the membrane so that the bonding force between the NPs and membrane substrate was expected to be stronger, as the membrane was able to bond with the NPs through both chemical and physical interactions. Moreover, the deposition of SiO$_2$ NPs was found more uniform on the PEI B surface as observed from the higher magnification surface morphology images. In addition, the skin layer cross section images of PEI B-fSiO$_2$ are also shown in FIG. 6. The embedment of the fSiO$_2$ NPs in the top skin layer of the PEI B-fSiO$_2$ can be observed from the cross section images.

Figure 7:
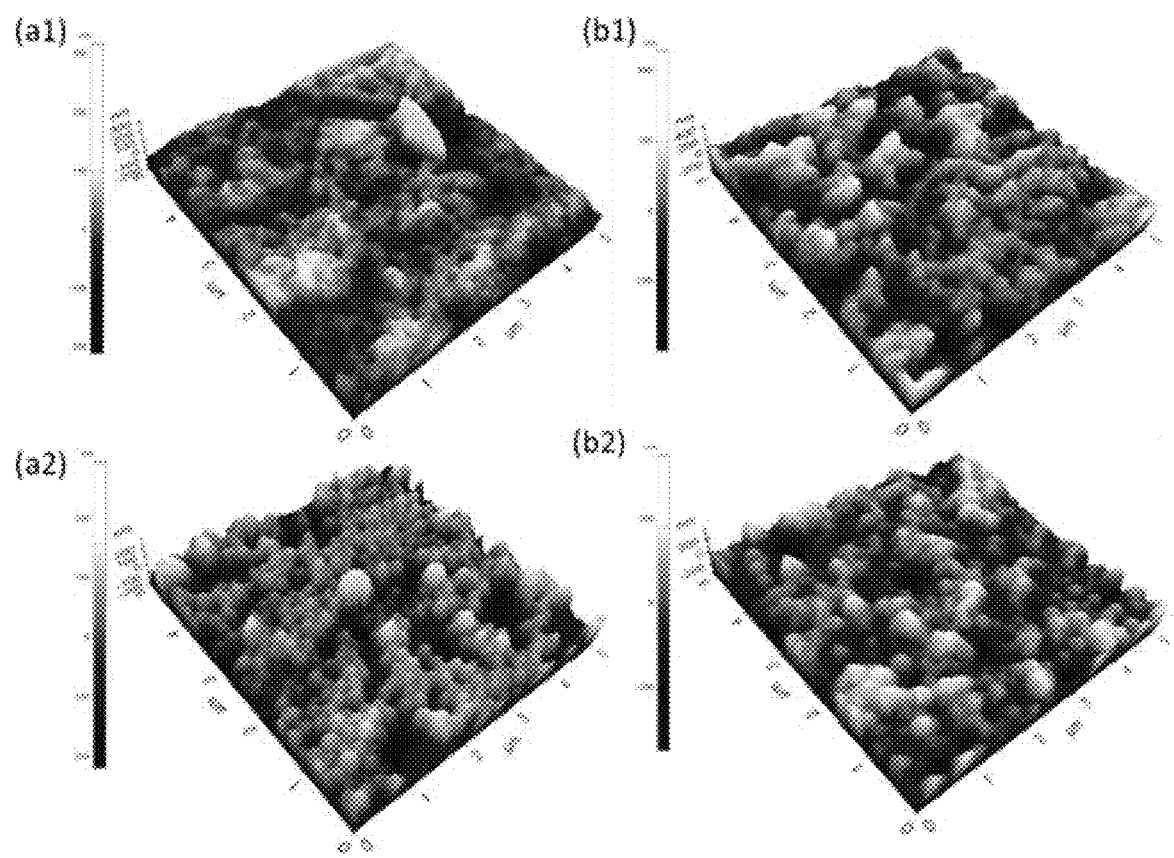
FIG. 7 shows 3-D topography AFM images of (a1) PEI A, (b1) PEI B, (a2) PEI A-fSiO$_2$, and (b2) PEI B-fSiO$_2$ membranes of Example 1.

The three-dimensional surface images and surface roughness parameters of the PEI membranes before and after fSiO$_2$ incorporation were analyzed by Atomic Force Microscopy (AFM), and the results are shown in FIG. 7 and Table 3. Roughness parameters, the mean roughness (Ra) defined as the arithmetic average of the absolute values of the surface height deviations measured from the center plane, and the root mean square roughness (Rq) representing the standard deviation from the mean surface plane were obtained with the AFM analysis software. Comparing with the two as-spun substrates, apparently the PEI B showed a much higher roughness due to the cellular surface morphology. After the fSiO$_2$ incorporation, the membrane PEI A-fSiO$_2$ exhibited enhanced roughness due to the nanostructured architecture on the membrane surface resulted from the presence of fSiO$_2$ NPs. It is worth mentioning the roughness of the PEI B-fSiO$_2$ became smaller compared with the PEI B. This was possibly because embedding the NPs may partially fill the holes of the membrane surface, thus reduced the roughness.

TABLE 3

Surface roughness parameters of the PEI membranes before and after fSiO$_2$ incorporation.

| | Roughness | |
|---|---|---|
| Membrane code | $R_a$ (nm) | $R_q$ (nm) |
| PEI A | 35.80 | 50.58 |
| PEI B | 79.12 | 99.87 |
| PEI A-fSiO$_2$ | 64.99 | 79.91 |
| PEI B-fSiO$_2$ | 72.92 | 92.08 |

Surface Hydrophobicity of the PEI-fSiO$_2$ Composite Membranes

The membrane surface hydrophobicity was indicated by the dynamic contact angle measurement. Table 4 shows the dynamic contact angle results of the PEI membrane before and after fSiO$_2$ incorporation. It can be seen that for the first cycle advancing value, the PEI B (109.9±1.4) was higher than the PEI A (86.2±1.1) due to the higher surface roughness of the PEI B. However, the PEI B was getting wetted quickly as indicated by the second and third cycle advancing values which dropped significantly and even became lower than that of the PEI A. This was believed to be caused by the large pore sizes in the skin layer of the PEI B, where water could enter easily and wet the surface. After the SiO$_2$ NPs incorporation and hydrophobic treatment, the contact angles of the membranes behaved in a different way. It can be seen that the second and third cycle advancing contact angles were almost the same as the first cycle for both PEI A-fSiO$_2$ and PEI B-fSiO$_2$ which indicated the membranes were highly hydrophobic and kept completely dry after immersing in the water.

TABLE 4

Dynamic contact angles of the PEI membranes before and after fSiO$_2$ incorporation.

| Membrane code | Contact direction | First cycle (°) | Second cycle (°) | Third cycle (°) | Hysteresis (°) |
|---|---|---|---|---|---|
| PEI A | Advancing | 86.2 ± 1.1 | 70.7 ± 2.5 | 70.4 ± 2.7 | 23.2 ± 4.1 |
| | Receding | 47.6 ± 1.5 | 47.5 ± 1.6 | 47.6 ± 1.7 | |
| PEI B | Advancing | 109.9 ± 1.4 | 60.8 ± 1.7 | 58.3 ± 3.1 | 12.7 ± 2.5 |
| | Receding | 48.0 ± 1.0 | 48.1 ± 0.8 | 48.2 ± 0.9 | |
| PEI A-fSiO$_2$ | Advancing | 121.0 ± 2.0 | 121.0 ± 2.1 | 120.8 ± 2.2 | 22.3 ± 3.3 |
| | Receding | 98.2 ± 1.0 | 98.7 ± 1.1 | 98.7 ± 1.5 | |
| PEI B-fSiO$_2$ | Advancing | 123.2 ± 1.3 | 123.2 ± 0.7 | 123.2 ± 0.7 | 15.9 ± 4.5 |
| | Receding | 106.1 ± 3.9 | 107.2 ± 3.9 | 107.1 ± 3.8 | |
| PVDF | Advancing | 92.3 ± 3.7 | 89.8 ± 5.1 | 89.2 ± 5.0 | 32.6 ± 7.4 |
| | Receding | 57.6 ± 2.6 | 7.2 ± 2.3 | 57.2 ± 2.4 | |

Based on the second cycle values, both PEI A-fSiO$_2$ and PEI B-fSiO$_2$ membrane showed an increment in advancing and receding contact angles of more than 50° because of the nanostructured architecture generated by fSiO$_2$ NPs and highly hydrophobic fluoro-compounds of PFTS on the membrane surface. In particular, the PEI B-fSiO$_2$ showed a higher advancing contact angle of 123.2±0.7° (53° increment) and a receding contact angle of 107.2±3.9° (60° increment) due to the greater surface roughness. The difference between advancing and receding contact angles is called contact angle hysteresis. A high advancing/receding contact angle and low contact angle hysteresis is responsible for the low wettability of a material surface [9]. The contact angle hysteresis here was calculated according the second cycle advancing and receding contact angles. The PEI B-fSiO$_2$ showed a very low contact angle hysteresis of 15.9±4.5°. The inherently hydrophobic membrane PVDF was prepared according to Loh et al. [10] and the contact angle values were also tested. The newly developed PEI-fSiO$_2$ membranes showed significantly higher values than PVDF membranes in all contact angle categories.

Mechanical Properties of the PEI-fSiO$_2$ Composite Membranes

Table 5 shows the mechanical properties of the PEI membranes before and after fSiO$_2$ NPs incorporation in terms of tensile modulus, stress at break and strain at break. The PEI B showed tensile modulus of 233.7±14.3, which was significantly higher than that of the PEI A (116.9±7.8). A high tensile modulus suggests a high rigidity of the membrane. The stress at break and strain at break of the PEI B reached 10.4±0.2 and 49.4±3.6, as compared to 5.4±0.1 and 21.1±2.1 of the PEI A, respectively. The combination of high tensile strength and strain at tensile strength makes the membrane have a high toughness. The PEI B had higher rigidity, toughness and elongation properties than that of the PEI A, which was attributed to its more interconnected pore structure, while the PEI A had a finger-like pore structure and macrovoids on it cross section. On the other hand, due to the incorporation of inorganic NPs on the PEI substrate, the composite PEI membranes showed higher rigidity but less elongation properties compared with the as-spun substrates, which was attributed to the intrinsic brittle property of inorganic materials.

TABLE 5

Mechanical properties of the PEI membranes before and after fSiO$_2$ incorporation.

| Membrane code | Tensile modulus (MPa) | Stress at break (MPa) | Strain at break (%) |
| --- | --- | --- | --- |
| PEI A | 116.9 ± 7.8 | 5.4 ± 0.1 | 21.1 ± 2.1 |
| PEI B | 233.7 ± 14.3 | 10.4 ± 0.2 | 49.4 ± 3.6 |
| PEI A-fSiO$_2$ | 125.6 ± 5.7 | 5.5 ± 0.1 | 11.3 ± 0.4 |
| PEI B-fSiO$_2$ | 274.9 ± 16.2 | 10.6 ± 0.1 | 19.2 ± 1.0 |

Application of the PEI-fSiO$_2$ Membranes in GLMC for CO$_2$ Absorption

Figure 8:
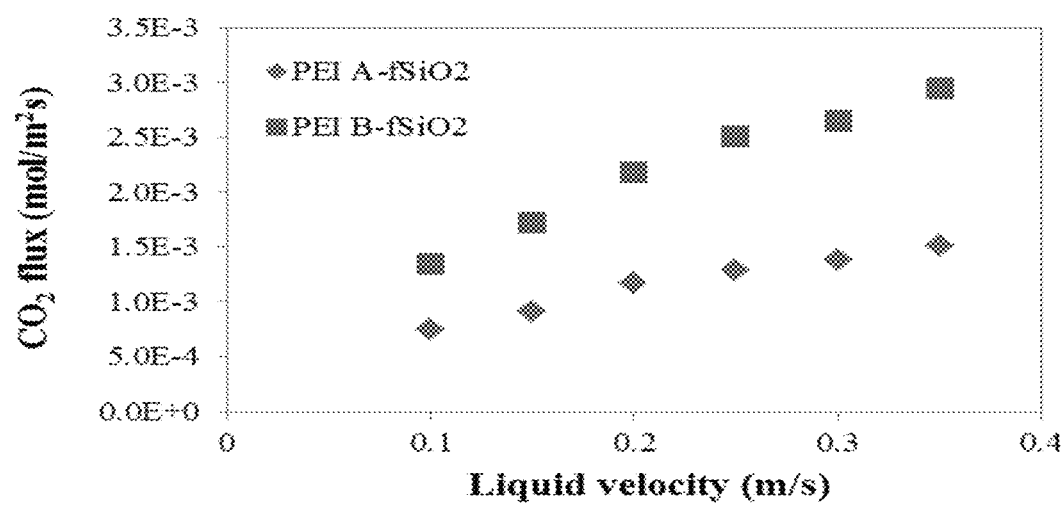
FIG. 8 shows $CO_2$ flux using pure water as the absorbent (atmospheric pressure, absorbent temperature at 25° C., gas flow rate at 30 ml/min) illustrated in Example 1.

The PEI A-fSiO$_2$ and PEI B-fSiO$_2$ fibers were tested for CO$_2$ absorption in GLMC. The performance of CO$_2$ absorption with the change of the liquid velocity is shown in FIG. 8. Pure CO$_2$ and pure water was used in this experiment. It can be observed that the CO$_2$ flux increased with the increase in the water flow rate. This is a well-known behavior in membrane contactor which indicates the main resistance exists in the liquid phase in the case of physical absorption of CO$_2$ [11-13]. The change in gas velocity hardly affected the absorption performance. As can be seen from FIG. 8, the PEI B-fSiO$_2$ possessed much higher CO$_2$ flux than that of the PEI A-fSiO$_2$. At a liquid velocity of 0.3 m/s, the PEI A-fSiO$_2$ showed the CO$_2$ flux of 1.38×10$^{-3}$ mol/m$^2$·s while the PEI B-fSiO$_2$ showed the CO$_2$ flux of 2.65×10-3 mol/m$^2$·s, which was almost twice of the PEI A-fSiO$_2$'s flux. This was most likely due to the higher surface porosity and bigger pore sizes of the PEI B-fSiO$_2$ membrane which significantly reduced the mass transfer resistance. In contrast, the relatively dense skin layer of the PEI A-fSiO$_2$ imposed higher mass transfer resistance compared with the PEI B-fSiO$_2$. Moreover, the high degree of pore interconnectivity in the cross section the PEI B-fSiO$_2$ was believed to be another factor contributing to its high flux.

Figure 9:
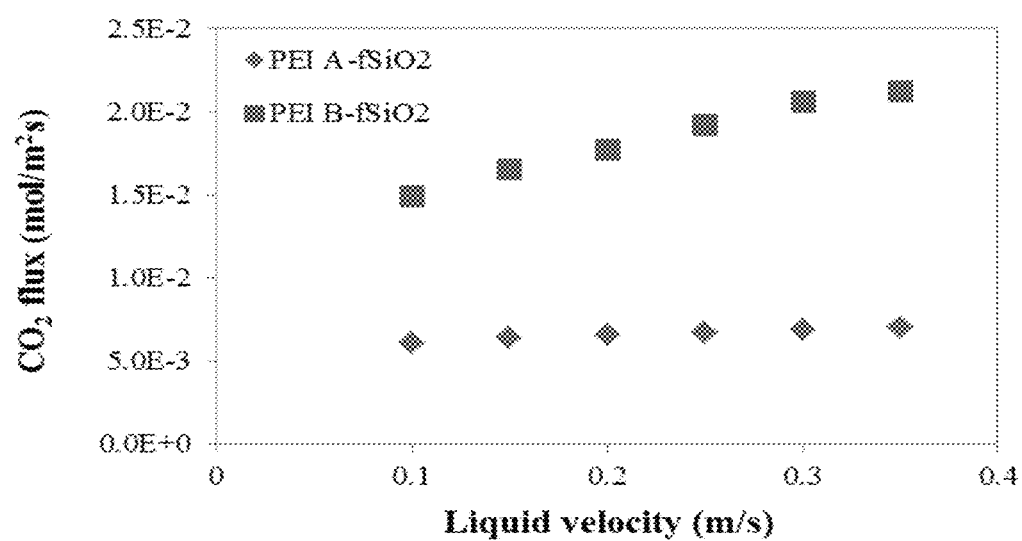
FIG. 9 shows $CO_2$ flux using 2 M sodium taurinate as the absorbent (atmospheric pressure, absorbent temperature at 25° C., gas flow rate at 100 ml/min) illustrated in Example 1.

FIG. 9 shows the CO$_2$ flux of the composite PEI-fSiO$_2$ membranes by using amino acid salts as the absorbent liquid, e.g. a 2 M aqueous sodium taurinate solution. It is well understood that the physical absorption suffers low separation efficiency than chemical absorption. In the case of chemical absorption by using a 2 M aqueous sodium taurinate solution, the CO$_2$ flux of the PEI A-fSiO$_2$ was 6.83×10$^{-3}$ mol/m$^2$·s at a liquid velocity of 0.3 m/s; it was 4 times higher than the flux in physical absorption at the same liquid velocity. While the CO$_2$ flux of the PEI B-fSiO$_2$ was 2.06×10$^{-2}$ mol/m$^2$·s, which was 6.7 times higher than the flux in physical absorption. In addition, the flux of the PEI B-fSiO$_2$ was three times of the PEI A-fSiO$_2$'s flux because of its higher surface porosity and pore interconnectivity beneath the top layer. Moreover, it is observed that with the increase in liquid velocity, CO$_2$ absorption flux increased. This was because there was a significant solvent depletion in the shell side due to the high pure CO$_2$ concentration in the gas phase. Thus, the solvent concentration would drop dramatically at the gas-liquid interface and instantaneous absorption regime took place. An increase in the solvent velocity would reduce its depletion at the interface, and therefore enhanced the mass transfer efficiency [14].

Figure 10:
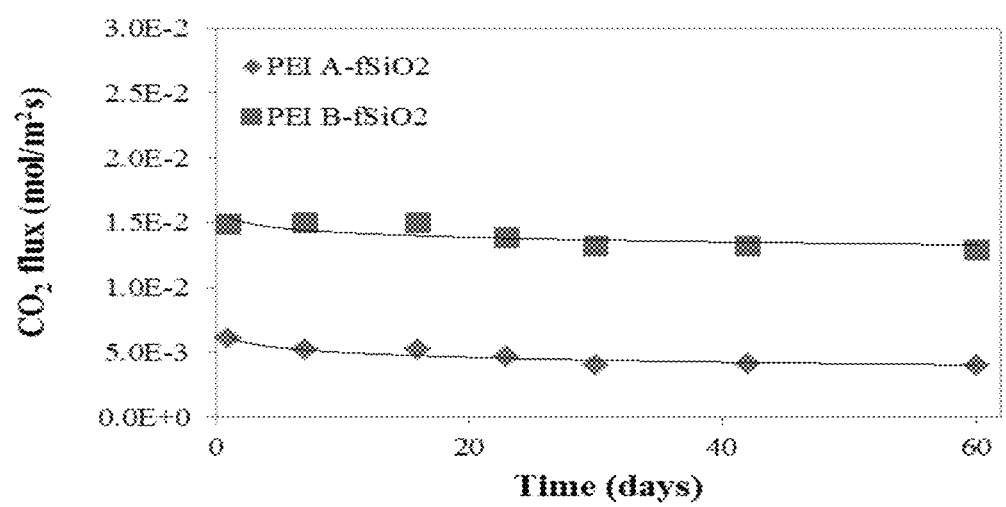
FIG. 10 shows long-term $CO_2$ flux using 2 M sodium taurinate as the absorbent (atmospheric pressure, absorbent temperature at 25° C., gas flow rate at 100 ml/min, liquid velocity at 0.1 m/s) illustrated in Example 1.

The long-term performance of CO$_2$ flux of the PEI A-fSiO$_2$ and PEI B-fSiO$_2$ membranes by using 2 M sodium taurinate were carried out for 60 days. Measurements were carried out periodically to observe the change in CO$_2$ absorption flux. The membrane contactor modules were fully immersed in the sodium taurinate solution after every experiment to ensure that the outer surfaces of the hollow fibers would be in constant contact with the absorbent. The experimental results are shown in FIG. 10. The CO$_2$ flux of the PEI B-fSiO$_2$ membrane was consistently higher than that of the PEI A-fSiO$_2$ membrane. Through the 60 days testing, the PEI B-fSiO$_2$ membrane was able to maintain a very stable performance with CO$_2$ flux around 1.4×10$^{-2}$ mol/m$^2$·s while the flux of the PEI A-fSiO$_2$ decreased gradually from 6.0×10$^{-3}$ mol/m$^2$·s to 4.0×10$^{-3}$ mol/m$^2$·s, suggesting that the PEI A-fSiO$_2$ was partially wetted by the 2 M sodium taurinate solution. This was probably due to the relatively lower surface hydrophobicity of the PEI A-fSiO$_2$ membranes as compared with PEI B-fSiO$_2$. The long-term test indicated the great potential of PEI B-fSiO$_2$ membranes in GLMC application, and also revealed the important role of membrane fabrication and modification techniques in facilitating the commercialization of membrane contactor applications.

Table 6 shows the summary of the CO$_2$ flux of various membranes used in GLMCs. We can see that the PEI B-fSiO$_2$ (#2) possessed superior CO$_2$ absorption performance over the other commercial and in-house made hydrophobic organic membranes. The surface modifying macromolecule (SMM) modified PEI hollow fiber membranes (#11) also showed a very high $CO_2$ flux, but the hydrophobicity was relatively low with contact angle of 95° and the long term performance of the membrane was not available [15]. In fact, it is rare that the in house-made hollow fiber membranes experienced long-term stability investigation, in particular for such a long period of time—2 months. Both the high $CO_2$ flux and stable long-term performance indicated the PEI B-$fSiO_2$ hollow fiber membranes have the great potential to be used practically in GLMC process, which also reveals the important role of membrane engineering in the industrial processes of membrane-based separation techniques.

TABLE 6

Overall comparison of $CO_2$ flux of various membranes used in GLMCs.

| Membrane code | Polymer type | ID/OD (mm) | $CO_2$ flux$^a$ (mol m$^{-2}$ s$^{-1}$) | Shell side | Manufacturer | Ref. |
|---|---|---|---|---|---|---|
| #1 | PEI | 0.7/1 | $1.38 \times 10^3$ | Water | In-house made | Current work |
| #2 | PEI | 0.7/0.9 | $2.65 \times 10^3$ | | | |
| #3 | PAI | 1.1/1.4 | $1.54 \times 10^3$ | Water | In-house made | [13] |
| #4 | PAI | 1.1/1.4 | $8.5 \times 10^{-4}$ | Water | In-house made | [16] |
| #5 | PVDF | 0.3/0.4 | $1.0 \times 10^3$ | Water | In-house made | [17] |
| #6 | PVDF | —/— | $8.0 \times 10^{-4}$ | | Tianjin Motian | |
| #7 | PVDF | 0.3/0.5 | $8.0 \times 10^{-4}$ | Water | In-house made | [18] |
| #8 | PVDF | 0.65/1 | $6.5 \times 10^{-4}$ (extrapolated) | $CO_2$ | Memcor Australia | [19] |
| #9 | PSf | 0.5/1 | $7.5 \times 10^{-4}$ | $CO_2$ | In-house made | [20] |
| #10 | PEI | 0.3/0.6 | $1.2 \times 10^3$ | $CO_2$ | In-house made | [15] |
| #11 | PEI | 0.35/0.6 | $2.3 \times 10^3$ | $CO_2$ | | |
| #12 | PP | 0.22/0.23 | $1.4 \times 10^3$ | $CO_2$ | Celgard Inc. | [21] |

$^a$Achieved at the liquid velocity of 0.3 m/s.

Example 2

In this Example, the hydrophobicity of the composite membrane surface was dramatically elevated, as evidenced by the dynamic contact angles increment, e.g. from original 66.71 to 124.81 for advancing values, and from 49.51 to 100.61 for receding values. In addition, it was observed the mechanical property of the composite membrane was better than some of the conventional polymeric membranes such as polyethersulfone (PES), and polyvinylidene fluoride (PVDF). The composite membrane was also not as brittle as the pure inorganic membrane. Highly hydrophobic membrane is the core elementing as-liquid membrane contactor and the newly developed PEI-$fSiO_2$ composite hollow fiber membranes in this Example were intended for the use in such application. The $CO_2$ absorption flux of the composite membranes was investigated in both physical and chemical absorptions in a gas-liquid membrane contactor system. Moreover, the membrane contactor showed a reasonably stable performance throughout the 31 days long-term operation using a 2M sodium taurinate aqueous solution as the liquid absorbent and pure $CO_2$ as the feed gas. The chemical compatibility test indicated that after the long-term constant contact with the sodium taurinate, the hydrophobicity of the PEI-$fSiO_2$ composite membrane still maintained and was much higher than that of original PEI substrate and conventional hydrophobic polymeric membranes such as PVDF. The incorporation of the $fSiO_2$ inorganic layer not only offered high hydrophobicity, but also would protect the polymeric substrate from the attacks of chemical absorbents, affording the membrane a longer lifespan.

Materials

The membrane material, polymer PEI, commercially known as Ultem® 1000 (Mn=12,000, Mn/Mw=2.5), was purchased from GE Plastic. N-Methyl-2-pyrrolidone (NMP, >99.5%, CAS #872-50-4, Merck) was used as a solvent. Lithium chloride (LiCl, anhydrous, CAS #7447-41-8, MP Biomed) was used as the membrane pore former. (3-Aminopropy)trimethoxysilane (APTMS, 97%, CAS #13822-56-5, Aldrich), tetraethylorthosilicate (TEOS, >99%, CAS #78-10-4, Merck) and 1H,1H,2H,2H-perfluorodecyltriethoxysilane (PFTS, 97%, CAS #101947-16-4, Aldrich) were used as membrane surface modification reagents. Iso-propanol (IPA, 99.9%, CAS #67-63-0, Merck), ammonium (26% $NH_3 \cdot H_2O$, Merck) and ethanol (CAS #64-17-5, Merck) was used for preparing the modification solutions. Milli-Q deionized water was used in all aqueous solutions (18 MΩ/cm). Taurine ($C_2H_7NO_3S$, 99%, CAS #107-35-7, Acros) and sodium hydroxide (NaOH, CAS #1310-73-2, Merck) were used to prepare the 2M sodium taurinate solution as the liquid absorbent used in membrane contactor. All the reagents were used as received.

PEI Membrane Preparation

The PEI asymmetric hollow fiber substrates were fabricated by a dry-jet wet spinning technique. The polymer dope solution was prepared by dissolving the pre-dried PEI polymer powder and LiCl as pore former with desired amounts in NMP solvent at the temperature of 60° C. for 3 days. The homogenous dope solution was then cooled down to room temperature and subsequently degassed under vacuum for overnight before spinning. In the spinning process, the dope and bore fluid were extruded through a spinneret at a controlled rate and went through an air gap before immersing into a coagulation bath containing tap water. The nascent hollow fibers were collected at a certain take-up speed using a rotating drum. The take-up speed equals to the product of the collecting drum circumference and the drum speed. The collected fibers were subsequently stored in a water bath for at least 2 days to remove residual solvents. The spinning conditions were summarized in Table 7.

TABLE 7

Spinning conditions for fabricating PEI hollow fiber membranes.

| Parameters | PEI |
|---|---|
| Dope composition (PVDF/LiCl/NMP)(wt %) | 14/3/83 |
| Dope flow rate (g/min) | 6.0 |
| Bore fluid (NMP/$H_2O$) (wt %) | 80/20 |
| Bore fluid flow rate (ml/min) | 5.0 |
| Air gap (cm) | 5 |
| Take up speed (m/s) | 7.15 |

TABLE 7-continued

Spinning conditions for fabricating PEI hollow fiber membranes.

| Parameters | PEI |
| --- | --- |
| External coagulant | Tap water |
| Spinning temperature (° C.) | 25 |
| Spinneret diameter (mm) | 1.50 |
| ID of bore fluid needle (mm) | 0.70 |

Formation of the Organic-Inorganic Composite Membrane

Figure 11:
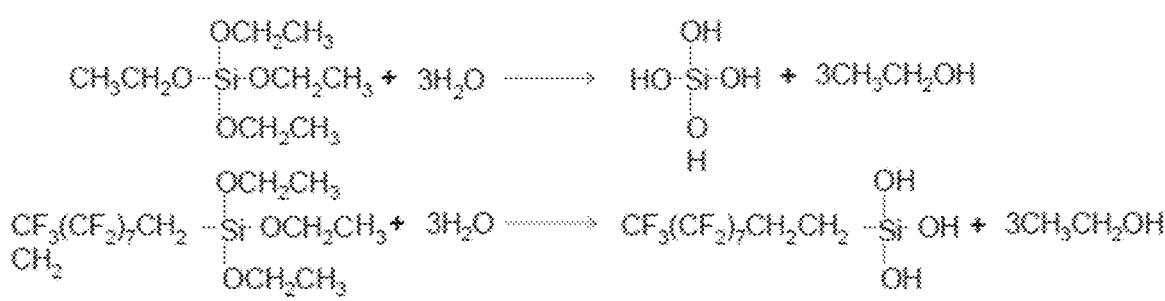
FIG. 11 shows the hydrolysis and polycondensation reaction routes of TEOS and PFTS of Example 2.
Figure 11:
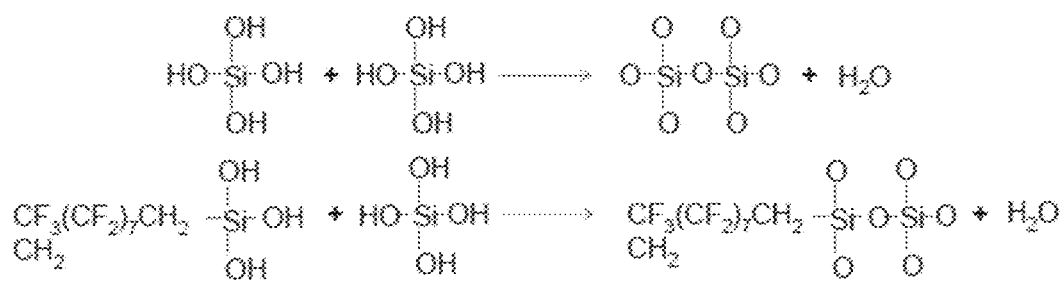

In the first step, the PEI membranes were treated in a 2% (w/v) APTMS solution in a mixture of IPA and Milli-Q water (vol 1:1) at the water bath of 70° C. for 3 h. The membranes were then rinsed with abundant amount of Milli-Q water to remove APTMS residue. Next, the fSiO$_2$ precursor solution, e.g. TEOS/PFTS mixture was prepared based on the well-known Stober method. Briefly, a 20 ml TEOS with appropriate amount of PFTS (mole ratio TEOS:PFTS=10:1) were dissolved in a 100 ml ethanol solution and mixed well. The solution was added dropwise to another solution containing 24 ml ammonium in a 100 ml ethanol solution. The hydrolysis and polycondensation reaction routes of TEOS and PFTS are shown in FIG. 11. Herein, two treatment approaches were investigated.

Figure 12:
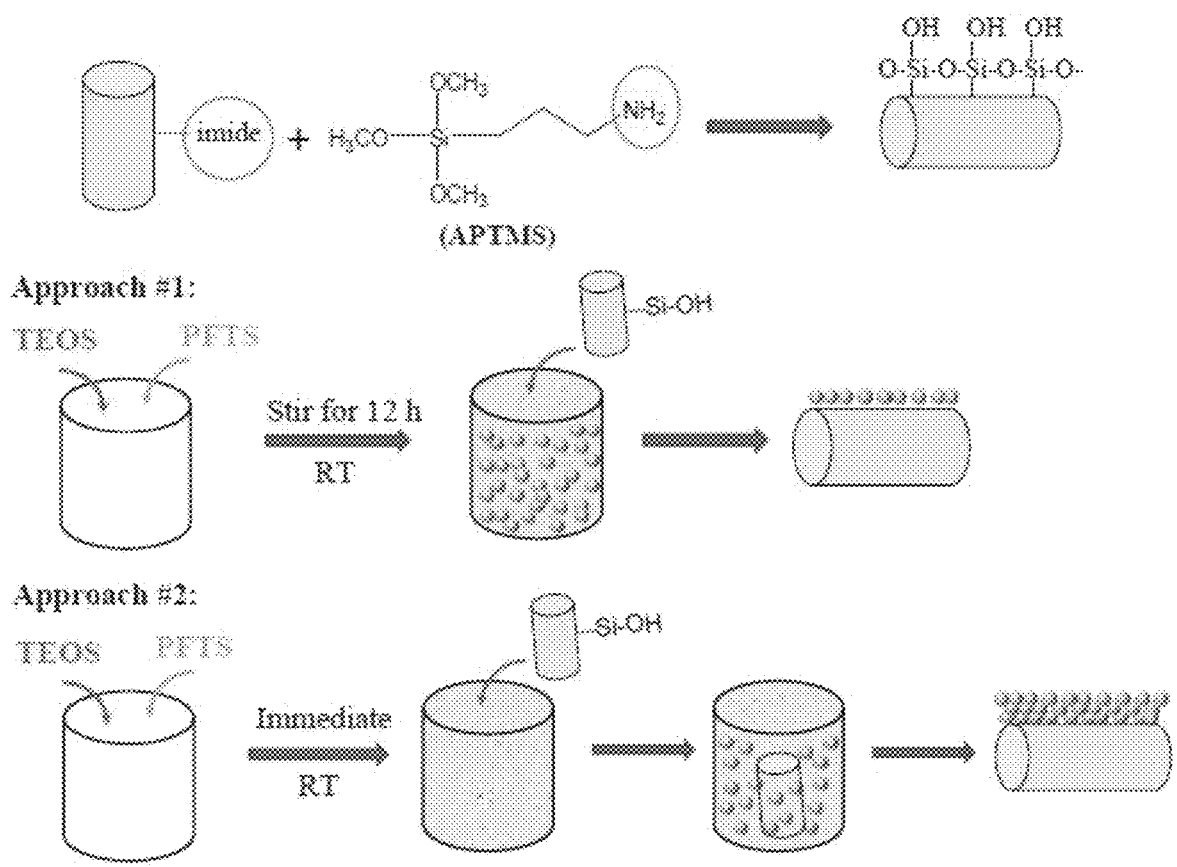
FIG. 12 shows the formation of the organic-inorganic composite membranes by approach 1 and approach 2 mentioned in Example 2.

In approach 1, the mixture solution was stirred intensively overnight at room temperature and treated by ultrasonication probe for 20 min before use. The APTMS treated PEI membrane were immersed in the above solution for 2 h. The mechanism of fSiO$_2$ particles formation in this sol preparation was proposed and examined by Wang et al. [22]. They prepared TEOS and fluoroalkylsilane (FAS) solutions separately so that TEOS and FAS molecules were allowed to hydrolyze independently. It was observed that the TEOS solution quickly turned milky, while the FAS formed a thick and clean resin and phase-separated from the solution. Thus, it was assumed that the co-hydrolysis of these two silane precursors could quickly form SiO$_2$ particle cores by TEOS with slowly hydrolysed FAS molecules attached outside of the cores. The adhesion of the fSiO$_2$ particles to the substrate was assumed to originate from the formation of interfacial chemical bonds, e.g. Si—O—Si or Si—O—C bonds [22]. In present case, the adhesion force was formed by condensation of partially hydrolyzed TEOS/PFTS and silanol groups on the PEI membrane surface. The reaction route is illustrated schematically in FIG. 12.

In approach 2, the APTMS treated PEI substrates were immersed immediately into the prepared mixture solution before TEOS/PFTS start to hydrolyse, so that the silanol groups on the membrane surface also participated in the hydrolysis and condensation reactions and induced vertical polymerization to form grafted polysiloxane on the membrane surface, which was expected to enhance the chemical bonding between membrane surface and the sol molecules. The reaction route is also drawn in FIG. 12. The membranes were immersed in the solution for 1 h, 3 h and 5 h, respectively.

In the last step, the TEOS/PFTS treated membranes from approach 1 and approach 2 were placed in an oven at 100° C. for 2 h. The final organic-inorganic composite membranes were designated as PEI-fSiO$_2$ membranes.

Membrane Characterizations

Characterizations of the as-Spun PEI Substrate

The dimension of the hollow fiber membranes was measured by a Keyence VHX 500F Digital Microscope. Three different fibers were taken and a mean value was calculated for each sample measurement.

The membrane pore size was measured by a capillary flow porometer (CFP 1500A, from Porous Material. Inc. (PMI)). The membrane samples were fixed into the sample holder and immersed in a liquid (Galwick) till the samples were completely wetted. Galwick has a surface tension of $16.0 \times 10^{-3}$ N/m. During the test, the gas flow rate was increased stepwise and passed through the saturated sample until the applied pressure exceeded the capillary attraction of the liquid in the pores. By comparing the gas flow rates of a wet and dry sample at the same pressures, the percentage of flow passing through the pores larger than or equal to the specified size can be calculated from the pressure-size relationship [23]. The overall membrane porosity E was measured using a method based on the density measurements [24, 25]. The equation of calculating E is shown below:

$$\varepsilon = \left(1 - \frac{\rho_{membrane}}{\rho_{PEI}}\right) \times 100\%$$

where $\rho_{membrane}$ is the density of the membrane and $\rho_{PEI}$ is the density of the PEI powder. The $\rho_{membrane}$ was calculated by membrane weight and volume. Membrane weight was determined by an analytical balance. The membrane volume was calculated according to the inner/outer diameters and the length of the fiber sample. The $\rho_{PEI}$ is taken as 1.27 g/cm$^3$. An average value of the three times of test results was considered as the overall membrane porosity. The characteristics of the as-spun PEI substrate have been listed in Table 8.

TABLE 8

Characteristics of the as-spun PEI substrate.

| Parameters | PEI |
| --- | --- |
| Fiber OD (mm) | 1.1 |
| Fiber ID (mm) | 0.8 |
| Fiber thickness (μm) | 150 |
| Fiber mean pore size (μm) | 0.04 |
| Fiber porosity | 81 |

Confirmation of the Formation of the Composite Membranes

The formation of the PEI-fSiO$_2$ composite membranes was examined by ATR-FTIR spectra. ATR-FTIR spectra were collected at room temperature over a scanning range of 650-4000 cm$^{-1}$ with a resolution of 4.0 cm$^{-1}$, using an IR Presitige-21 FT-IR (Shimadzu, Japan). The spectrometer was installed with a deuterated triglycine sulphate doped with L-analine (DLATGS) detector and KBr beamsplitter. Spectral analysis was performed using FT-IR software (IR Solution, Shimadzu).

Thermal decomposition of the membrane before and after modification was measured by the TGA. It was conducted on a thermal analyser (Pekin Elmer Pyris7) at a heating rate of 10° C./min in a nitrogen atmosphere.

Membrane Morphology Observation

The membrane samples were observed by the Scanning Electron Microscope (SEM, JSM-7600F JOEL) at an operating voltage of 5 kV. The membrane samples were broken in liquid nitrogen and then sputtered with a thin layer of gold using EMITECH SC7620 sputter coater prior to analysis.

Surface Hydrophobicity and Mechanical Properties of the Composite Membranes

A tensiometer (DCAT11 Dataphysics, Germany) was used to perform the dynamic contact angle measurement to determine the hydrophobic properties of the fibers. A sample fixed by the sample holder was hung from the arm of an electro-balance, and then experienced a cycle of immersion into DI water and successive emersion. The weigh difference was continuously recorded by the electro-balance during the above loop at an interfacial moving rate of 0.2 mm/min and an immersion depth of 5 mm. Three immersion/emersion cycles were carried out for each specimen, and each run was repeated three times for all the hollow fiber samples to confirm the reproducibility within the statistical deviation. The contact angle was calculated from the wetting force based on the Wihelmy method.

Mechanical stability of the membranes was tested by an Instruon 5542 tensile test machine. The tensile modulus, tensile strength, strain at tensile strength, stress at break and strain at break were tested to indicate the membrane's mechanical strength and the degree of deformation that could be expected under a given load. The test was carried out at room temperature and 75% humidity.

Gas-Liquid Membrane Contactor Performance

The composite hollow fiber membranes were subjected to the $CO_2$ absorption test in a gas-liquid membrane contactor. The fibers were assembled into the PTFE modules. The characteristics of the membrane contactor modules are given in Table 9.

TABLE 9

Characteristics of the membrane contactor module.

| | |
|---|---|
| Module ID (mm) | 6.4 |
| Module length (mm) | 25 |
| Fiber OD (mm) | 1.1 |
| Fiber ID (mm) | 0.8 |
| Effective fiber length (cm) | 16 |
| Effective membrane area (cm$^2$) | 22 |
| Number of fibers | 4 |

Pure $CO_2$ was employed as the feed gas and the pure water or a 2 M sodium taurinate aqueous solution was used as the liquid absorbents to measure the $CO_2$ absorption flux. The liquid passed through the shell side and the gas flowed counter-currently through the lumen side of the hollow fibers, as the hydrophobic layers of the composite membranes were in the outer surfaces. In a typical experiment, a digital variable flow peristaltic pump (MasterFlex) was used to control the liquid flow and pumped the liquid into the shell side of the hollow fibers from a 10 l container. The pressures at the inlet and the outlet of the shell side were recorded. The liquid flow rate was also checked at the outlet at regular intervals. The feed gas was introduced into the system from a compressed gas cylinder and the flow rate was adjusted by mass flow controllers (Cole-Parmer). The gas pressures were indicated by the pressure gauges at the lumen inlet and outlet. The gas volume flow rates at the inlet and the outlet of the module were measured by digital bubble meters (Bios Defender 510L). The $CO_2$ flux was calculated by the difference of $CO_2$ flow rate before and after the contactor module. The experiment was conducted at room temperature and the experimental data were only recorded after the system was stabilized. The schematic experimental setup can be seen elsewhere [16]. The $CO_2$ absorption flux was calculated based on the following Eq. [5]:

$$J_{CO_2} = \frac{Q_{in} \times C_{in} - Q_{out} \times C_{out}}{0.0244 \times A \times 60}$$

where $J_{CO_2}$ denotes the $CO_2$ absorption flux, mol/(m$^2$/s); $Q_{in}$ and $Q_{out}$ represent the inlet and outlet gas flow rate, respectively, ml/min; $C_{in}$ and $C_{out}$ are the $CO_2$ volumetric fraction in the gas inlet and outlet, respectively, % (100% for pure $CO_2$ gas); A represents the gas-liquid mass transfer area and herein equals to the effective membrane area, m$^2$.

Results and Discussion

Confirmation of the Surface Modification Mechanism

The chemical structure of the original PEI membrane, APTMS treated PEI membrane and PEI-fSiO$_2$ composite membrane was examined by ATR-FTIR. As can be seen in FIG. 5, the typical imide bands was observed at 1778 cm$^{-1}$ and 1719 cm$^{-1}$ which corresponded to the asymmetric and symmetric C—O stretching of the original PEI membrane. The absorption band at 1353 cm$^{-1}$ was assigned to the bond stretching vibration of C—N—C in phthalimide rings. After the APTMS treatment, the intense absorption bands between 1000 cm$^{-1}$ and 1200 cm$^{-1}$ were observed due to the asymmetric stretching vibration of siloxane groups (Si—O—Si). The broad peak around 3200-3600 cm$^{-1}$ was due to the stretching of O—H group from the hydrolysed APTMS on the membrane surface. A band at 1535 cm$^{-1}$ appeared due to the deformation of N—H moiety which was associated with amide II band, indicating that the phthalimide rings was opened, and imide group transferred successfully to amide through the reaction with APTMS. For the spectrum of the fSiO$_2$ incorporated PEI membranes, the PEI characteristic peaks became less intense which was attributed to the coverage of the fSiO$_2$ layer on the top of the membrane surface. A very intense peak at 1070 cm$^{-1}$ was assigned to the siloxane asymmetric bond stretching of Si—O—Si or Si—O—R groups (R is a hydrocarbon such as —CH$_2$CH$_3$) [8], which proved the existence of SiO$_2$ particles on the membrane surface. The peak at 1199 cm$^{-1}$ could be due to the C—F stretching from PFTS. The ATR-FTIR spectra confirmed the formation of the PEI-fSiO$_2$ composite membrane.

Figure 13:
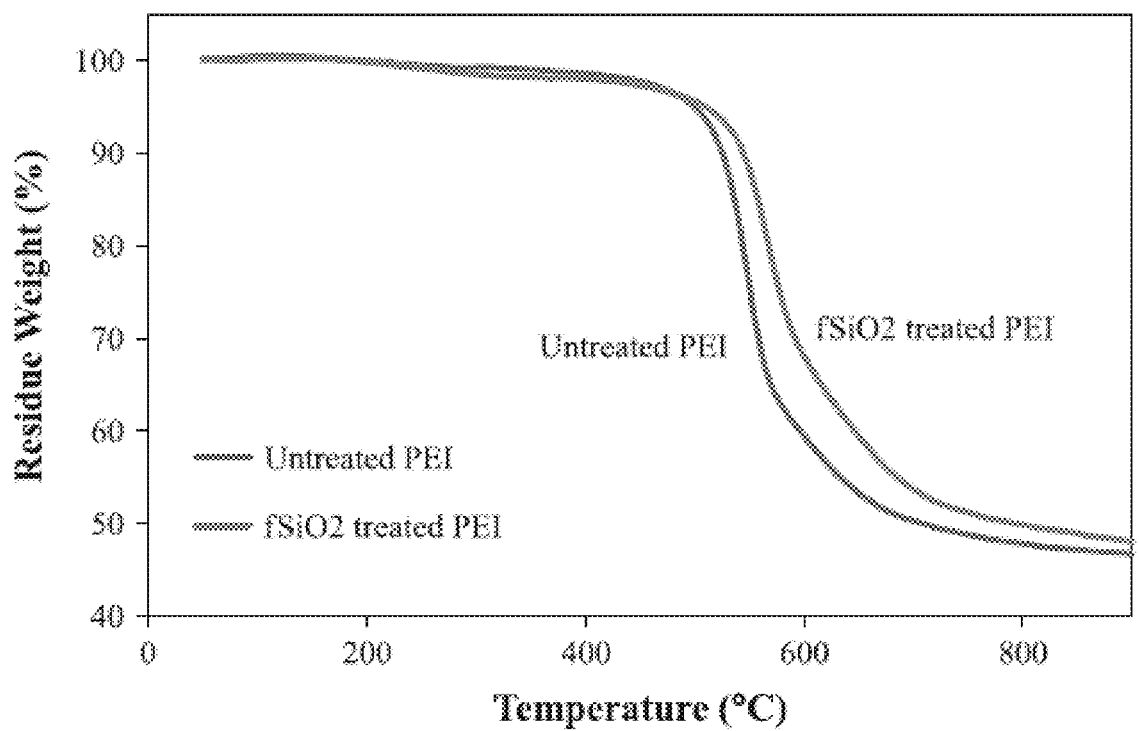
FIG. 13 shows TGA curves of the original PEI substrate and the PEI-fSiO$_2$-3h composite membranes of Example 2.

FIG. 13 shows the TGA curves of the original PEI substrate and the PEI-fSiO$_2$-3h composite membranes. The thermal decomposition of PEI mainly occurred in a temperature range of 500-700° C. The composite membrane with fSiO$_2$ incorporation showed slightly higher thermal stability than the original PEI substrate because of the existence of an inorganic layer on the membrane surface, which had a higher thermal resistance. This result confirmed the successful formation of the PEI-fSiO$_2$ composite membrane.

Membrane Morphology Observation

Figure 14:
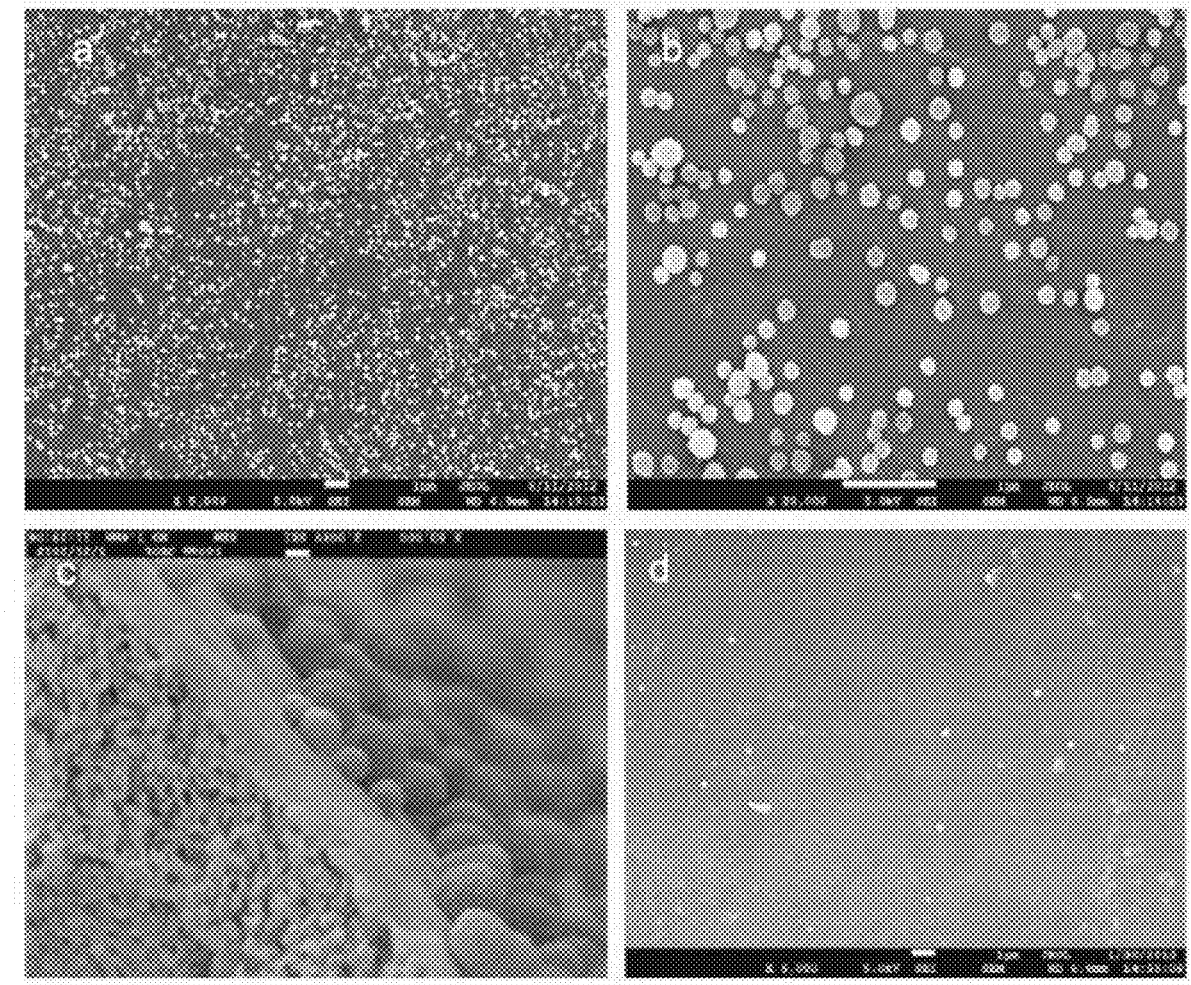
FIG. 14 shows SEM images of the composite (approach 1) hollow fiber membranes (a) surface (5000×); (b) surface_enlarged (20,000×); (c) cross-section (50,000×); (d) surface_after ultrasonication (5000×) of Example 2.
Figure 15:
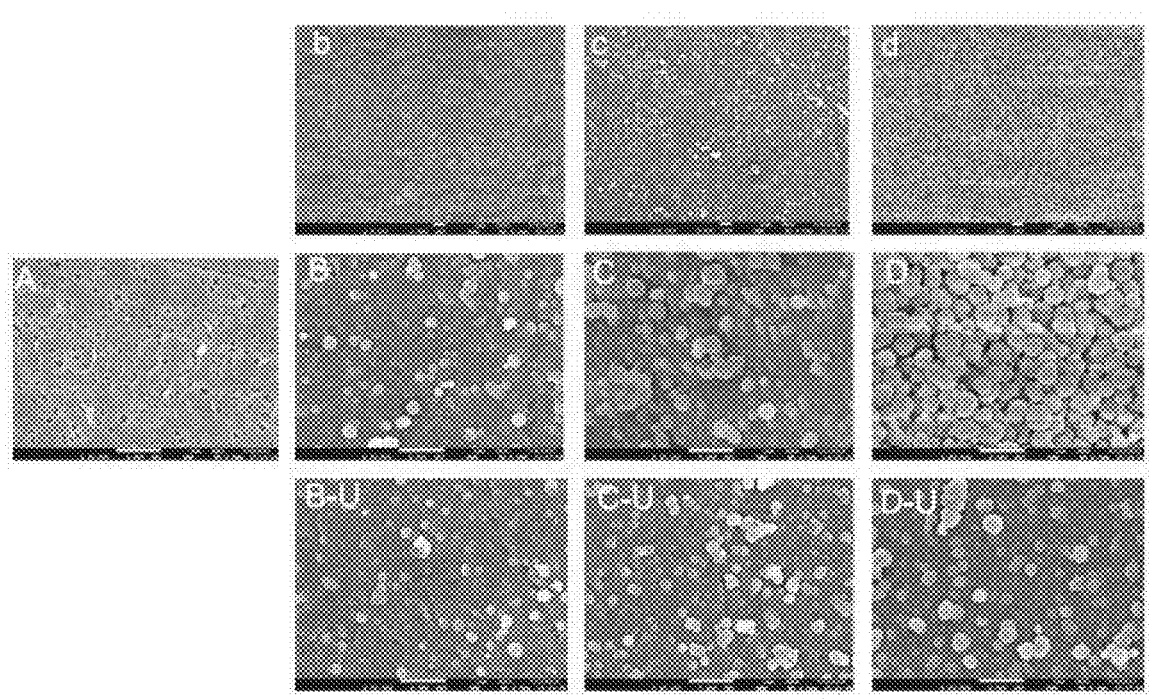
FIG. 15 shows SEM images of the original substrate and composite (approach 2) hollow fiber membranes (A) original surface (20,000×); (b) fSiO$_2$-1h treated (5000×); (B) fSiO$_2$-1h treated_enlarged (20,000×); ((B)-(U)) fSiO$_2$-1h treated_after ultrasonication (20,000×); (c) fSiO$_2$-3h treated (5000×); (C) fSiO$_2$-3h treated_enlarged (20,000×); (C-U) fSiO$_2$-3h treated_after ultrasonication (20,000×); (d) fSiO$_2$-5h treated (5000×); (D) fSiO$_2$-5h treated_enlarged (20,000×); (D-U) fSiO$_2$-5h treated_after ultrasonication (20,000×) of Example 2.

The SEM images of the composite membranes formed by two approaches are shown in FIGS. 14 and 15, respectively. It can be clearly observed the morphology differences. By using approach 1, as shown in FIG. 14, a single layer of fSiO$_2$ particles was deposited on the membrane surface with an average particle size of around 150 nm to 200 nm. However, after the ultrasonic treatment, most of the fSiO$_2$ particles disappeared. Although this approach was reported applicable on other material surfaces [31], in present study by using polymeric membrane as the substrate, the fSiO$_2$ particles were easily removed by ultrasonic treatment, which implied the weak bonding between fSiO$_2$ and PEI substrate.

The SEM images of the membrane treated by approach 2 are shown in FIG. 15. It can be seen that with an increase in the treatment time of PEI membrane in the TEOS/PFTS solution, a larger amount of fSiO$_2$ were attached to the membrane surface. At 5 h modification time, the membrane surface exhibited typical inorganic membrane morphology, as shown in FIG. 15(d) and (D) [26]. Ultrasonication test was used to examine the stability of the fSiO$_2$ layer on the membrane surface. It can be observed that the fSiO$_2$ layer was less affected by the ultrasonic treatment, which indicated the good structural stability of the composite membrane.

Figure 16:
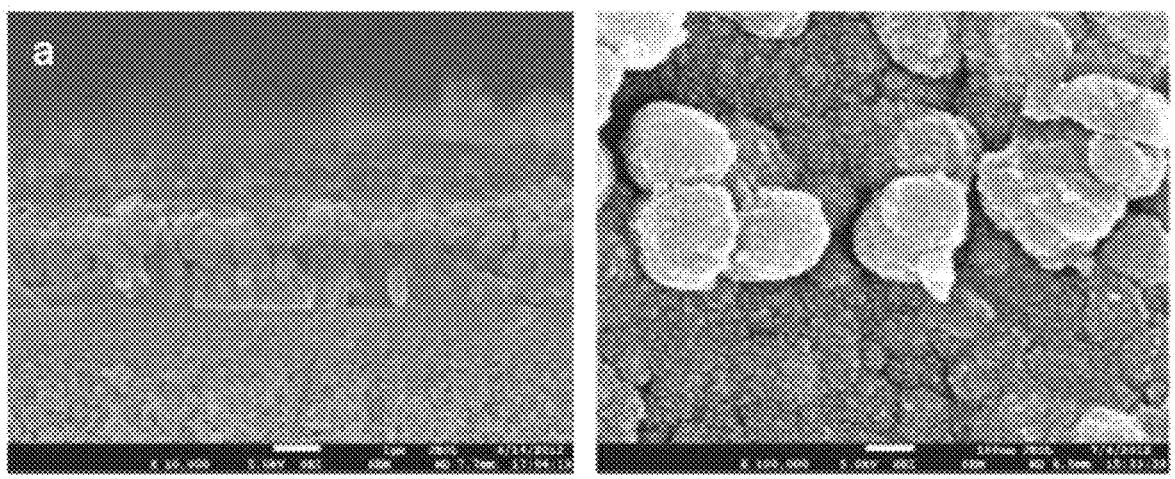
FIG. 16 shows SEM images of (a) cross-section of fSiO$_2$-5h treated (approach 2) composite hollow fiber membrane (10,000×) and (b) surface of fSiO$_2$ layer (100,000×) of Example 2.

This was probably because the silanol groups on the membrane surface were involved in the hydrolysis and polycondensation of TEOS/PFTS, which directly induced the vertical polymerization and condensation of silane compounds to form grafted polysiloxane on the membrane surface, leading to a strong interfacial covalent bonding between fSiO$_2$ layer and the polymeric substrate [26]. FIG. 16(a) shows the cross-section morphology of the composite membrane with fSiO$_2$ treatment for 5 h, layers of fSiO$_2$ particles were deposited on top of the membrane surface. The fSiO$_2$ layer surface is shown in FIG. 16(b), the hierarchical structure with multilevel roughness can be observed which played an important role in shifting the membrane wettability to highly hydrophobic. This was confirmed by the contact angle measurement which would be discussed later. In addition, for the membranes treated for 5 h, the stacked layers of fSiO$_2$ were removed after the ultrasonic treatment and the bottom layer which was chemically bonded to the membrane surface remained there, as shown in FIGS. 15(D) and (D-U).

Hydrophobicity of the Composite Membranes

The membrane surface hydrophobicity was studied by measuring the dynamic contact angles. Table 10 shows dynamic contact angle results of the original PEI substrate and composite PEI-fSiO$_2$ membrane with different fSiO$_2$ treatment time. Advancing contact angle always exceeds or equals to the receding contact angle. The difference between advancing and receding contact angles is called contact angle hysteresis. A high advancing/receding contact angle and low contact angle hysteresis is responsible for the low wetting property of a material surface [9]. In addition, the membrane surface was dry before it was immersed into the DI water in the first cycle, thus, the data based on the $2^{nd}$ and $3^{rd}$ cycles were considered as a better characterization of the wetted membranes [27]. The contact angles mentioned below therefore are referred to the value from $2^{nd}$ cycle, unless specified otherwise. For the PEI-fSiO$_2$ composite membranes, the advancing contact angle increased dramatically from 66.7° of the original membrane to 124.8° of the membrane at 3 h fSiO$_2$ treatment. This was believed due to the combination factors of a reduced surface free energy and enhanced roughness generated by the fSiO$_2$ layer. The receding contact angle was also significantly higher than that of the original membrane, e.g. 100.6° vs. 49.5°. Moreover, the contact angle hysteresis decreased from 32.8° at 1 h treatment to around 24° at 3 h and 5 h treatment due to a larger amount of PFTS existing on the membrane surface.

TABLE 10

Dynamic contact angle results of the original PEI substrate and composite PEI-fSiO$_2$ membrane with different treatment time.

| Membrane code | Contact direction | First cycle (°) | Second cycle (°) | Third cycle (°) | Contact Angle Hysteresis (°) |
|---|---|---|---|---|---|
| Original PEI | Advancing | 96.6 ± 1.5 | 66.7 ± 2.4 | 67.0 ± 2.7 | 17.2 ± 2.8 |
| | Receding | 49.7 ± 0.3 | 49.5 ± 0.4 | 49.3 ± 0.5 | |
| PEI-fSiO$_2$-1h | Advancing | 124.4 ± 1.5 | 124.7 ± 1.8 | 125.1 ± 1.8 | 32.8 ± 3.1 |
| | Receding | 99.7 ± 1.9 | 91.9 ± 1.3 | 91.7 ± 1.9 | |
| PEI-fSiO$_2$-3h | Advancing | 124.9 ± 1.4 | 124.8 ± 1.4 | 125.7 ± 1.6 | 24.2 ± 3.7 |
| | Receding | 100.5 ± 2.7 | 100.5 ± 2.3 | 100.7 ± 2.8 | |
| PEI-fSiO$_2$-5h | Advancing | 124.4 ± 1.4 | 124.6 ± 1.8 | 125.3 ± 2.1 | 24.6 ± 3.6 |
| | Receding | 98.0 ± 2.9 | 100.0 ± 1.8 | 99.3 ± 1.8 | |

Mechanical Properties of the Composite Membranes

The mechanical property is an important parameter for membrane practical applications. The tensile modulus, tensile strength, strain at tensile strength, stress at break and strain at break of the composite membranes are shown in Table 11. Tensile modulus was calculated based on the combination of tensile strength and strain at the tensile strength. A high tensile modulus suggests a high rigidity of the membrane. It can be seen that as the reaction progressed, the membrane rigidity increased from 1 h to 3 h treatment and decreased during the further reaction process. The increase in the membrane rigidity was due to the presence of the inorganic fSiO$_2$ layer on the membrane surface. When the treatment time increased to 5 h, although a larger amount of fSiO$_2$ was expected to be generated on the membrane surface, the polymeric substrate became weaker due to the overlong reaction in the alkaline solution. Thus, the membrane rigidity dropped. The membrane tensile strength and stress at break followed the same trend as the tensile modulus. On the other hand, as the reaction progressed, the membrane became more brittle, which was indicated by a drop of both strain at tensile strength and strain at break. This was possibly because of the intrinsic brittleness property of inorganic materials. Thus, the organic-inorganic composite membranes exhibited weaker ductile property. In addition, the organic PEI substrate also became less ductile with reaction progression. Thus, 3 h treatment of fSiO$_2$ was suitable for the PEI membrane by considering the change of mechanical properties. In summary, the organic-inorganic composite membranes showed better mechanical properties compared with the conventional polymeric membrane, such as PES and PVDF [28, 29], and also not as brittle as pure inorganic membranes.

TABLE 11

Mechanical properties of the composite PEI-fSiO$_2$ membranes with different treatment time and the comparison with other common polymeric membranes.

| Membrane code | Tensile modulus (MPa) | Tensile Strength (MPa) | Strain at tensile strength (%) | Stress at break (MPa) | Strain at break (%) |
|---|---|---|---|---|---|
| PEI-fSiO$_2$-1h | 136.2 ± 0.3 | 2.4 ± 0.3 | 2.3 ± 0.1 | 2.4 ± 0.3 | 2.3 ± 0.1 |
| PEI-fSiO$_2$-3h | 140.0 ± 3.9 | 2.7 ± 0.2 | 2.0 ± 0.1 | 2.7 ± 0.2 | 2.0 ± 0.1 |
| PEI-fSiO$_2$-5h | 86.6 ± 3.2 | 1.7 ± 0.1 | 1.5 ± 0.2 | 1.7 ± 0.1 | 1.5 ± 0.2 |
| PES [28] | 57.5-104.0 | — | — | 0.9-1.7 | 9.9-16.9 |
| PVDF [29] | 26.9-33.5 | 0.6-1.1 | 74.0-116.0 | — | — |

Preliminary Application in Gas-Liquid Membrane Contactor for CO$_2$ Absorption

CO$_2$ Absorption in Membrane Contactor

Figure 17:
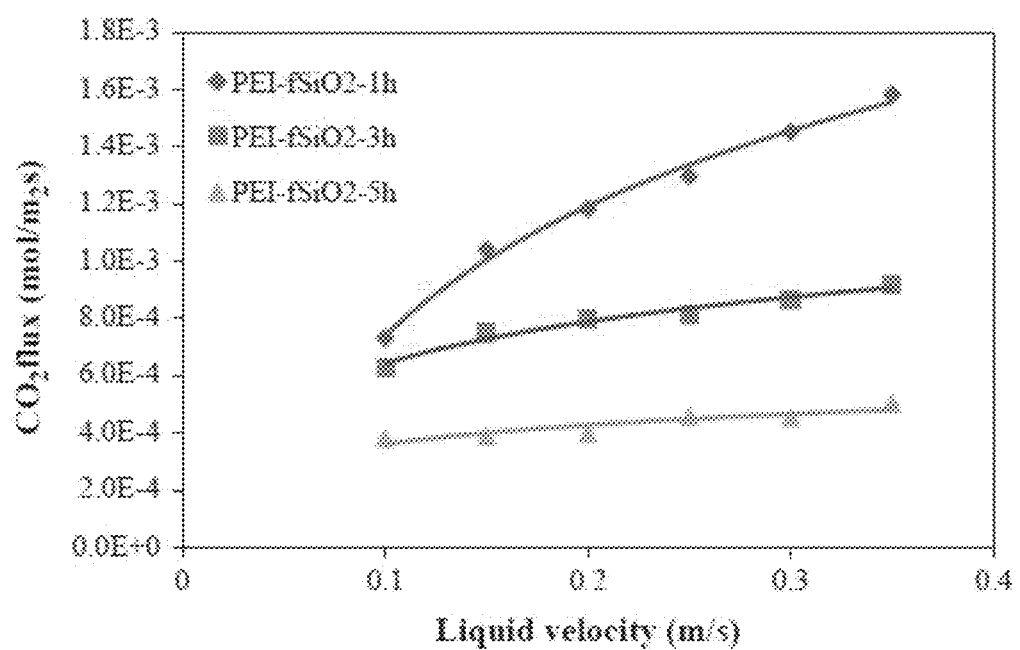
FIG. 17 shows $CO_2$ flux using pure water as the absorbent (atmospheric pressure, absorbent temperature: 25° C., gas flow rate: 30 ml/min) of Example 2.

The performance of CO$_2$ absorption by using the composite membranes with the change of the liquid velocity was tested. Pure CO$_2$ and pure water was used in this experiment. It can be seen from FIG. 17 that the CO$_2$ flux increased with the increase in flow rate of the pure water. This is a well-known behaviour in membrane contactor which indicates the main resistance exists in the liquid phase in the case of physical absorption of CO$_2$. The change in gas velocity hardly affected the absorption performance [11]. In addition, with increase in fSiO$_2$ treatment time, the CO$_2$ flux became smaller. This result is consistent with the observation from SEM images. With a longer treatment time, a larger amount of fSiO$_2$ and hence thicker fSiO$_2$ layer was generated on the membrane surface which would hinder the mass transfer of CO$_2$ gas.

Figure 18:
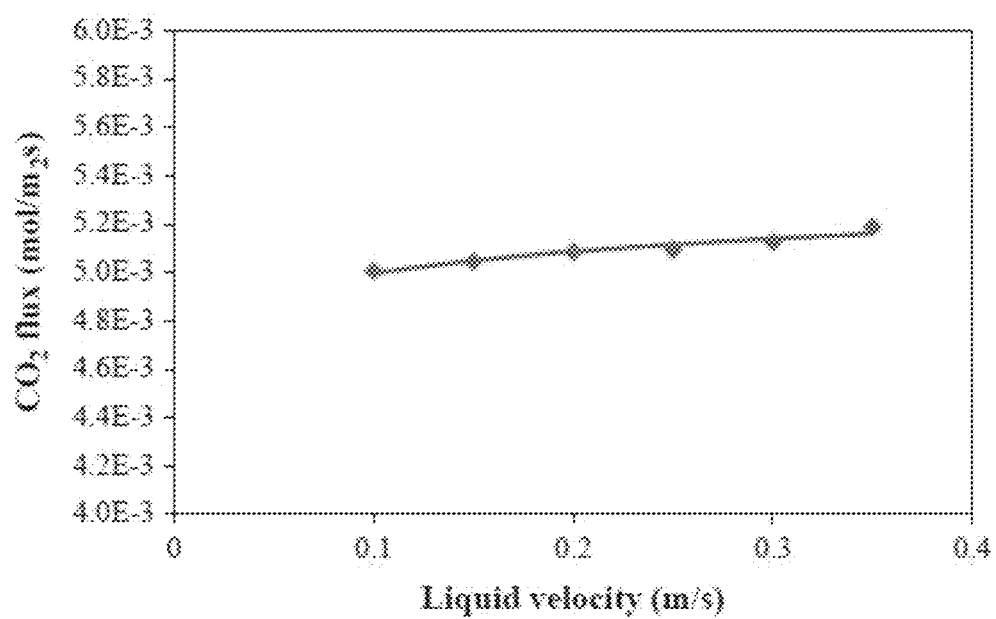
FIG. 18 shows $CO_2$ flux using sodium taurinate as the absorbent of PEI-fSiO$_2$-3h membrane (atmospheric pressure, absorbent temperature: 25° C., gas flow rate: 30 ml/min) of Example 2.
Figure 19:
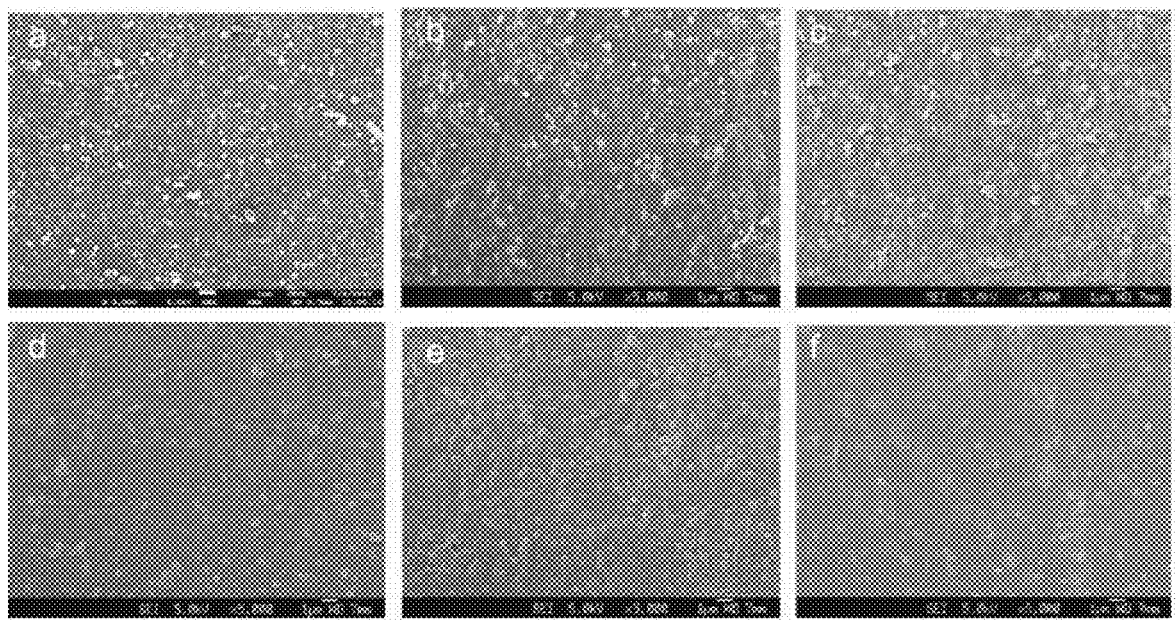
FIG. 19 shows SEM images (5000×) of the PEI-fSiO$_2$-3h composite membranes wo/w immersing in 2 M sodium taurinate solution (a) blank; (b) for 10 days; (c) for 20 days; (d) for 30 days; (e) for 40 days; (f) for 50 days of Example 2.

Chemical Compatibility of the Composite Membrane with Amino Acid Salts and Long-Term CO$_2$ Absorption Performance in Membrane Contactor The composite membrane PEI-fSiO$_2$-3h was used to investigate the CO$_2$ capture performance by chemical absorption. FIG. 18 shows the CO$_2$ flux by using amino acid salts as the absorbent liquid, e.g. 2 M aqueous sodium taurinate solution. It was observed that with the increase in liquid velocity, CO$_2$ absorption flux increased. This was because there was a significant solvent depletion in the shell side due to the high pure CO$_2$ concentration in the gas phase. Thus, the solvent concentration would drop dramatically at the gas-liquid interface and instantaneous absorption regime took place. Increase in the solvent velocity would reduce its depletion at the interface, and therefore enhanced the mass transfer efficiency [14]. The chemical compatibility between the membrane and liquid absorbent was examined by immersing the composite membrane PEI-fSiO$_2$-3h in the sodium taurinate solution for 50 days. The surface of the membrane was examined by SEM periodically to observe the morphology change during the immersion. The SEM images are shown in FIG. 19. During the 50-day immersion, the fSiO$_2$ layer remained on the membrane surface in spite of the direct exposure to the alkaline solvent. The dynamic contact angles of the immersed membranes were also investigated and summarized in Table 12.

TABLE 12

Dynamic contact angles of the PEI-fSiO$_2$-3h composite membranes after immersion in the chemical absorbent.

| Membranes wo/w immersion in a 2M taurinate sodium aqueous solution | Contact direction | First cycle (°) | Second cycle (°) | Third cycle (°) |
|---|---|---|---|---|
| Blank | Advancing | 124.9 ± 1.4 | 124.8 ± 1.4 | 125.7 ± 1.6 |
| | Receding | 100.5 ± 2.7 | 100.6 ± 2.3 | 100.7 ± 2.8 |
| 10 days | Advancing | 120.6 ± 1.3 | 120.5 ± 1.7 | 120.0 ± 1.9 |
| | Receding | 94.7 ± 2.9 | 91.3 ± 3.0 | 87.1 ± 3.0 |
| 30 days | Advancing | 115.7 ± 2.3 | 115.8 ± 2.6 | 115.5 ± 2.6 |
| | Receding | 87.7 ± 2.7 | 86.7 ± 2.1 | 82.6 ± 2.8 |
| 50 days | Advancing | 114.6 ± 3.5 | 114.4 ± 3.6 | 113.5 ± 3.7 |
| | Receding | 76.4 ± 3.1 | 75.8 ± 3.2 | 76.0 ± 3.4 |
| PVDF | Advancing | 92.3 ± 3.7 | 89.8 ± 5.1 | 89.2 ± 6.0 |
| | Receding | 57.6 ± 2.6 | 57.2 ± 2.3 | 57.2 ± 2.4 |

Figure 20:
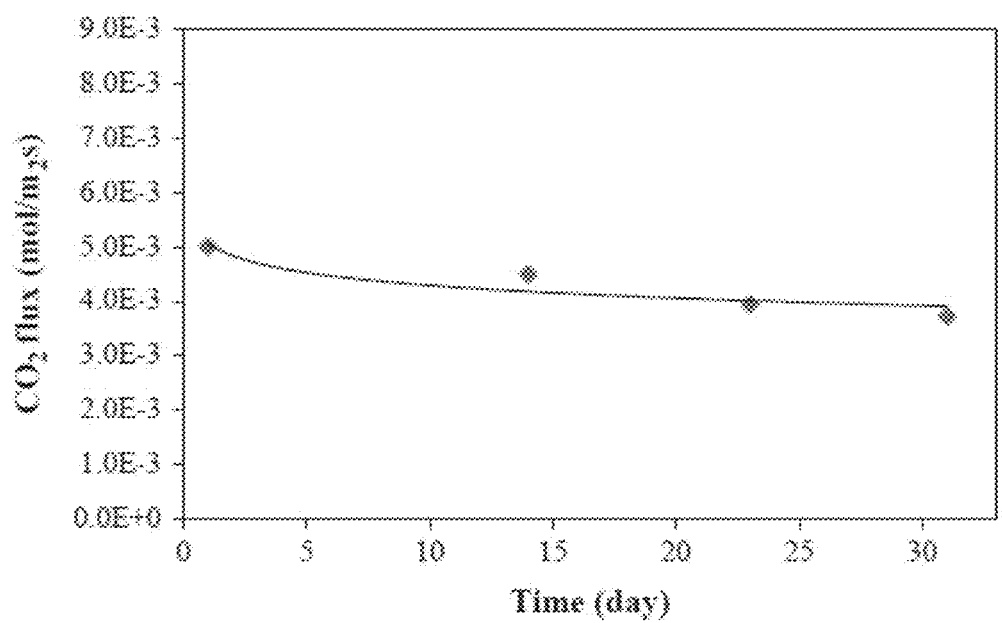
FIG. 20 shows long term $CO_2$ flux of PEI-fSiO$_2$-3h composite membrane using a 2 M sodium taurinate as the absorbent (atmospheric pressure, absorbent temperature: 25° C., gas flow rate: 30 ml/min) of Example 2.

It was found that the contact angles of the immersed membranes reduced gradually. Nevertheless, the hydrophobicity still maintained and was much higher than that of the original PEI substrate and conventional hydrophobic polymeric membranes such as PVDF, which was in-house prepared according to Loh et al. [10]. After the chemical compatibility test, a long-term test of the composite membrane PEI-fSiO$_2$-3h was conducted in the membrane contactor by using sodium taurinate as the absorbent. Testing of the membrane contactor was carried out periodically to observe the change in CO$_2$ absorption flux. The membrane contactor module was fully immersed in sodium taurinate solution after every experiment to ensure that the outer surfaces of the hollow fibers would be in constant contact with the absorbent. As can be seen from FIG. 20, the membrane contactor showed a reasonable stability throughout the 31-day operation with about 20% drop of the initial CO$_2$ flux. The composite membranes PEI-fSiO$_2$-1h and PEI-fSiO$_2$-3h were compared with other commercial and in-house made hydrophobic membranes in terms of dimension, pore size, porosity and CO$_2$ flux, as shown in Table 13.

TABLE 13

Overall comparison of various membranes used in membrane contactor for $CO_2$ absorption.

| Membrane code | Polymer type | ID/OD (mm) | Pore size (μm) | Porosity (%) | $CO_2$ flux[a] (mol m$^{-2}$ s$^{-1}$) | Shell side | Remarks | Manufacturer | Ref. |
|---|---|---|---|---|---|---|---|---|---|
| No. 1 | PEI | 0.8/1.1 | | | $1.45 \times 10^{-5}$ | Water | PEI-βiO$_2$-1h | In-house made | Current work |
| No. 2 | PEI | 0.8/1.1 | 0.04[b] | 81[b] | $8.68 \times 10^{-4}$ | Water | PEI-βiO$_2$-3h | In-house made | |
| No. 3 | PAI | 1.1/1.4 | MWCO[b] 20 kDa | 72 | $8.5 \times 10^{-4}$ | Water | APTMS & FS10 modified | In-house made | [16] |
| No. 4 | PVDF | 0.65/1 | 0.2 | 75 | $6.5 \times 10^{-4}$ extrapolated | $CO_2$ | Commercial | Memcor Australia | [19] |
| No. 5 | PVDF | 0.3/0.5 | MWCO 40 kDa | — | $8.0 \times 10^{-4}$ | Water | Pristine PVDF | In-house made | [18] |
| No. 6 | PVDF | 0.3/0.4 | MWCO 290 kDa | 76 | $1.0 \times 10^{-4}$ | Water | Phosphorous acid as the additive | In-house made | [17] |
| No. 7 | PVDF | NA | NA | NA | $8.0 \times 10^{-4}$ | Water | Commerical | Baujin Motian | |
| No. 8 | PSf | 0.5/1 | 0.01 | 72 | $7.5 \times 10^{-4}$ | $CO_2$ | Glycerol as the additive | In-house made | [20] |
| No. 9 | PEI | 0.35/0.6 | 0.07 | 81 | $2.3 \times 10^{-3}$ | $CO_2$ $CO_2$ | SMMs modified | In-house made | [15] |
| No. 10 | PP | 0.22/0.23 | 0.04 | 40 | $1.4 \times 10^{-3}$ | $CO_2$ | Commercial | Celgard Inc. | [21] |

[a]Achieved as the liquid velocity of 0.3 m/s.
[b]Pore size/porosity of the polymeric membrane substrate.

The pore size of the PEI substrate of the composite membranes was 0.04 mm. Incorporation of the fSiO$_2$ layer on the membrane surface would reduce the overall membrane pore size. The PEI-fSiO$_2$-3h showed reasonably good and similar O$_2$ flux compared with hydrophobically modified PAI, PVDF, and polysulfone (PSf) hollow fiber membranes [16-20]. However, PSf is less hydrophobic and not suitable to be used in membrane contactor, especially in the long-term operation. Bakeri et al. reported the SMM modified PEI membranes [15], which showed a significantly higher CO$_2$ flux due to the larger pore size of 0.07 mm, but the hydrophobicity was relatively low with contact angle of 95° and the long-term performance of the membrane was not available. The flux of PEI-fSiO$_2$-1h was comparable to the commercial Celgard microporous PP hollow fiber Mini Module® 0.75×5 from Celgard Inc. [21].

REFERENCES

[1] A. Mansourizadeh, A. F. Ismail, M. S. Abdullah, B. C. Ng, Preparation of polyvinylidene fluoride hollow fiber membranes for CO2 absorption using phase-inversion promoter additives, Journal of Membrane Science, 355 (2010) 200-207.

[2] S. Khaisri, D. deMontigny, P. Tontiwachwuthikul, R. Jiraratananon, A mathematical model for gas absorption membrane contactors that studies the effect of partially wetted membranes, Journal of Membrane Science, 347 (2010) 228-239.

[3] H. A. Rangwala, Absorption of carbon dioxide into aqueous solutions using hollow fiber membrane contactors, Journal of Membrane Science, 112 (1996) 229-240.

[4] A. C. M. Franken, J. A. M. Nolten, M. H. V. Mulder, D. Bargeman, C. A. Smolders, Wetting criteria for the applicability of membrane distillation, Journal of Membrane Science, 33 (1987) 315-328.

[5] P. S. Kumar, J. A. Hogendoorn, P. H. M. Feron, G. F. Versteeg, New absorption liquids for the removal of CO2 from dilute gas streams using membrane contactors, Chemical Engineering Science, 57 (2002) 1639-1651.

[6] L. Setiawan, L. Shi, W. B. Krantz, R. Wang, Explorations of delamination and irregular structure in poly(amide-imide)-polyethersulfone dual layer hollow fiber membranes, Journal of Membrane Science, 423-424 (2012) 73-84.

[7] W. Stöber, A. Fink, E. Bohn, Controlled growth of monodisperse silica spheres in the micron size range, Journal of Colloid And Interface Science, 26 (1968) 62-69.

[8] A. Irzh, L. Ghindes, A. Gedanken, Rapid deposition of transparent super-hydrophobic layers on various surfaces using microwave plasma, ACS Applied Materials and Interfaces, 3 (2011) 4566-4572.

[9] X. M. Li, D. Reinhoudt, M. Crego-Calama, What do we need for a superhydrophobic surface?A review on the recent progress in the preparation of superhydrophobic surfaces, Chemical Society Reviews, 36 (2007) 1350-1368.

[10] C. H. Loh, R. Wang, Effects of additives and coagulant temperature on fabrication of high performance PVDF/Pluronic F127 blend hollow fiber membranes via nonsolvent induced phase separation, Chinese Journal of Chemical Engineering, 20 (2012) 71-79.

[11] S. Atchariyawut, R. Jiraratananon, R. Wang, Separation of CO2 from CH4 by using gas-liquid membrane contacting process, Journal of Membrane Science, 304 (2007) 163-172.

[12] Y. Zhang, J. Sunarso, S. Liu, R. Wang, Current status and development of membranes for CO2/CH4 separation: A review, International Journal of Greenhouse Gas Control, 12 (2013) 84-107.

[13] Y. Zhang, R. Wang, L. Zhang, A. G. Fane, Novel single-step hydrophobic modification of polymeric hollow fiber membranes containing imide groups: Its potential for membrane contactor application, Separation and Purification Technology, 101 (2012) 76-84.

[14] S.-p. Yan, M.-X. Fang, W.-F. Zhang, S.-Y. Wang, Z.-K. Xu, Z.-Y. Luo, K.-F. Cen, Experimental study on the separation of CO2 from flue gas using hollow fiber membrane contactors without wetting, Fuel Processing Technology, 88 (2007) 501-511.

[15] G. Bakeri, A. F. Ismail, D. Rana, T. Matsuura, Development of high performance surface modified polyetherimide hollow fiber membrane for gas-liquid contacting processes, Chemical Engineering Journal, 198-199 (2012) 327-337.

[16] Y. Zhang, R. Wang, S. Yi, L. Setiawan, X. Hu, A. G. Fane, Novel chemical surface modification to enhance hydrophobicity of polyamide-imide (PAI) hollow fiber membranes, Journal of Membrane Science, 380 (2011) 241-250.

[17] S. Atchariyawut, C. Feng, R. Wang, R. Jiratananon, D. T. Liang, Effect of membrane structure on mass-transfer in the membrane gas-liquid contacting process using microporous PVDF hollow fibers, Journal of Membrane Science, 285 (2006) 272-281.

[18] C. Feng, R. Wang, H. Zhang, L. Shi, Diverse morphologies of PVDF hollow fiber membranes and their performance analysis as gas/liquid contactors, Journal of Applied Polymer Science, 119 (2011) 1259-1267.

[19] S. Atchariyawut, R. Jiratananon, R. Wang, Mass transfer study and modeling of gas-liquid membrane contacting process by multistage cascade model for CO2 absorption, Separation and Purification Technology, 63 (2008) 15-22.

[20] A. Mansourizadeh, A. F. Ismail, Effect of additives on the structure and performance of polysulfone hollow fiber membranes for CO2 absorption, Journal of Membrane Science, 348 (2010) 260-267.

[21] R. Wang, H. Y. Zhang, P. H. M. Feron, D. T. Liang, Influence of membrane wetting on CO2 capture in microporous hollow fiber membrane contactors, Separation and Purification Technology, 46 (2005) 33-40.

[22] H. Wang, J. Fang, T. Cheng, J. Ding, L. Qu, L. Dai, X. Wang, T. Lin, One-step coating of fluoro-containing silica nanoparticles for universal generation of surface super-hydrophobicity, Chem. Commun. (2008) 877-879.

[23] X. Yang, R. Wang, L. Shi, A. G. Fane, M. Debowski, Performance improvement of PVDF hollow fiber-based membrane distillation process, J. Membr. Sci. 369 (2011) 437-447.

[24] Y. Tang, N. Li, A. Liu, S. Ding, C. Yi, H. Liu, Effect of spinning conditions on the structure and performance of hydrophobic PVDF hollow fiber membranes for membrane distillation, Desalination 287 (2012) 326-339.

[25] J. Xu, Z. L. Xu, Poly(vinylchloride) (PVC) hollow fiber ultrafiltration membranes prepared from PVC/additives/solvent, J. Membr. Sci. 208 (2002) 203-212.

[26] H. Fang, J. F. Gao, H. T. Wang, C. S. Chen, Hydrophobic porous alumina hollow fiber for water desalination via membrane distillation process, J. Membr. Sci. 403-404 (2012) 41-46.

[27] L. Shi, R. Wang, Y. Cao, C. Feng, D. T. Liang, J. H. Tay, Fabrication of poly(vinylidene fluoride-co-hexafluropropylene) (PVDF-HFP) asymmetric microporous hollow fiber membranes, J. Membr. Sci. 305 (2007) 215-225.

[28] T. S. Chung, J. J. Qin, J. Gu, Effect of shear rate within the spinneret on morphology, separation performance and mechanical properties of ultrafiltration polyethersulfone hollow fiber membranes, Chem. Eng. Sci. 55 (2000) 1077-1091.

[29] P. Wang, M. M. Teoh, T. S. Chung, Morphological architecture of dual-layer hollow fiber for membrane distillation with higher desalination performance, Water Res. 45 (2011) 5489-5500.

The invention claimed is:

1. A method for forming an organic-inorganic composite hollow fiber membrane comprising an organic hollow fiber membrane having inorganic nanoparticles incorporated therein, the method comprising:
(I) contacting an organic hollow fiber membrane with an aminosilane solution to obtain a silanol-functionalized organic hollow fiber membrane; and
(II) contacting, for less than five hours, the silanol-functionalized organic hollow fiber membrane formed in (I) with an alkaline solution comprising a mixture of (i) a nanoparticle precursor and (ii) a hydrophobic fluoro-compound, before the nanoparticle precursor and the hydrophobic fluoro-compound start to hydrolyse, so as to have hydrolysis, polycondensation, and fluorination of the nanoparticle precursor occur simultaneously in the presence of the hydrophobic fluoro-compound, whereby the nanoparticle precursor hydrolyzes to form fluorinated inorganic nanoparticles chemically bonded to the silanol-functionalized organic hollow fiber membrane,
and wherein the inorganic nanoparticles comprise the fluorinated inorganic nanoparticles present as an inorganic layer on the membrane surface and embedded in the organic-inorganic composite hollow fiber membrane to provide the organic-inorganic composite hollow fiber membrane with a hierarchical structure of the inorganic nanoparticles with multilevel roughness across a cross-section of the organic-inorganic composite hollow fiber membrane.

2. The method of claim 1, wherein the organic hollow fiber membrane comprises an imide-containing polymer or copolymer.

3. The method of claim 2, wherein the imide-containing polymer or copolymer is selected from the group consisting of polyetherimide (PEI), poly (amide-imide) (PAI), polyimide (PI), and co-polyimide of 3,3'-4,4'-benzophenone tetracarboxylic dianhydride (BTDA)-toluene diisocyanate (TDI)/methylene diisocyanate (MDI) BTDA-TDI/MDI).

4. The method of claim 1, wherein the aminosilane solution comprises (3-aminopropyl) trimethoxysilane (APTMS), (3-aminopropyl) triethoxysilane (APTES), or (4-aminobutyl) triethoxysilane (ABTES).

5. The method of claim 1, wherein the fluorinated inorganic nanoparticles comprise silica ($SiO_2$), aluminum oxide ($Al_2O_3$), or titanium dioxide ($TiO_2$).

6. The method of claim 1, wherein the hydrophobic fluoro-compound is 1H,1H,2H,2H-perfluorooctylethoxysilane (FAS), 1H,1H,2H,2H-perfluorodecyl triethoxysilane (PFTS), or perfluoropolyether.

7. The method of claim 1, wherein the composite hollow fiber membrane comprises a PEI hollow fiber membrane having fluorinated $SiO_2$ nanoparticles incorporated therein.

8. The method of claim 1, wherein the organic hollow fiber membrane is formed from a dry-jet wet spinning technique.

9. The method of claim 8, wherein the spinning technique comprises a triple-orifice spinneret system.

10. An organic-inorganic composite hollow fiber membrane comprising an organic hollow fiber membrane having inorganic nanoparticles incorporated therein, wherein the organic-inorganic composite hollow fiber membrane is obtained from a method comprising:
(I) contacting an organic hollow fiber membrane with an aminosilane solution to obtain a silanol-functionalized organic hollow fiber membrane; and
(II) contacting, for less than five hours, the silanol-functionalized organic hollow fiber membrane formed in (I) with an alkaline solution comprising a mixture of (i) a nanoparticle precursor and (ii) a hydrophobic fluoro-compound, before the nanoparticle precursor and the hydrophobic fluoro-compound start to hydrolyse, so as to have hydrolysis, polycondensation, and fluorination of the nanoparticle precursor occur simultaneously in the presence of the hydrophobic fluoro-compound, whereby the nanoparticle precursor hydrolyzes to form fluorinated inorganic nanoparticles chemically bonded to the silanol-functionalized organic hollow fiber membrane, and wherein the inorganic nanoparticles comprise the fluorinated inorganic nanoparticles present as an inorganic layer on the membrane surface and embedded in the organic-inorganic composite hollow fiber membrane to provide the organic-inorganic composite hollow fiber membrane with a hierarchical structure of the inorganic nanoparticles with multilevel roughness across a cross-section of the organic-inorganic composite hollow fiber membrane.

11. The method of claim 1, wherein the fluorinated inorganic nanoparticles have an average particle size of less than 200 nm.

12. The organic-inorganic composite hollow fiber membrane of claim 10, wherein the fluorinated inorganic nanoparticles have an average particle size of less than 200 nm.

13. The method of claim 1, wherein the alkaline solution comprises ammonium.

14. The method of claim 1, wherein the contacting of the silanol-functionalized organic hollow fiber membrane with the alkaline solution comprises immersing the silanol-functionalized organic hollow fiber membrane into the alkaline solution.

15. The method of claim 1, wherein the nanoparticle precursor and the hydrophobic fluoro-compound comprise tetraethylorthosilicate (TEOS) and 1H,1H,2H,2H-perfluorodecyltriethoxysilane (PFTS), respectively.

16. The organic-inorganic composite hollow fiber membrane of claim 10, wherein the organic-inorganic composite hollow fiber membrane is operable to have the fluorinated inorganic particles retained thereon even when the organic-inorganic composite hollow fiber membrane is subjected to ultrasonic treatment.

17. A method, comprising:
(I) forming a silanol-functionalized organic hollow fiber membrane by contacting an organic hollow fiber membrane with an aminosilane solution; and
(II) forming an organic-inorganic composite hollow fiber membrane by at least partially immersing, for less than five hours, the silanol-functionalized organic hollow fiber membrane formed in (I) in an alkaline solution comprising a mixture of (i) a nanoparticle precursor and (ii) a hydrophobic fluoro-compound, before the nanoparticle precursor and the hydrophobic fluoro-compound start to hydrolyse, so as to have hydrolysis, polycondensation, and fluorination of the nanoparticle precursor occur simultaneously in the presence of the hydrophobic fluoro-compound, whereby the nanoparticle precursor hydrolyzes to form fluorinated inorganic nanoparticles during the immersion,
and wherein the organic-inorganic composite hollow fiber membrane comprises an organic hollow fiber membrane having the fluorinated inorganic nanoparticles present as an inorganic layer on the membrane surface and embedded in the organic-inorganic composite hollow fiber membrane to provide the organic-inorganic composite hollow fiber membrane with a hierarchical structure of the inorganic nanoparticles with multilevel roughness across a cross-section of the organic-inorganic composite hollow fiber membrane.

18. The method of claim 17, wherein the nanoparticle precursor is tetraethylorthosilicate (TEOS) and the hydrophobic fluoro-compound is 1H,1H,2H,2H-perfluorodecyltriethoxysilane (PFTS).

19. The method of claim 1, wherein the silanol-functionalized organic hollow fiber membrane formed in (I) is immersed in the alkaline solution before the nanoparticle precursor hydrolyzes.

* * * * *